US010302791B2

(12) United States Patent
Ma et al.

(10) Patent No.: US 10,302,791 B2
(45) Date of Patent: May 28, 2019

(54) ENHANCING RESERVOIR CHARACTERIZATION USING REAL-TIME SRV AND FRACTURE EVOLUTION PARAMETERS

(71) Applicant: Halliburton Energy Services, Inc., Houston, TX (US)

(72) Inventors: Jianfu Ma, Pearland, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 216 days.

(21) Appl. No.: 15/305,141

(22) PCT Filed: May 23, 2014

(86) PCT No.: PCT/US2014/039390
§ 371 (c)(1),
(2) Date: Oct. 19, 2016

(87) PCT Pub. No.: WO2015/178931
PCT Pub. Date: Nov. 26, 2015

(65) Prior Publication Data
US 2017/0045636 A1 Feb. 16, 2017

(51) Int. Cl.
*G01V 1/40* (2006.01)
*G01V 1/30* (2006.01)
(Continued)

(52) U.S. Cl.
CPC ............ *G01V 1/40* (2013.01); *E21B 41/0092* (2013.01); *E21B 43/26* (2013.01); *E21B 49/00* (2013.01);
(Continued)

(58) Field of Classification Search
None
See application file for complete search history.

(56) References Cited

U.S. PATENT DOCUMENTS 5,963,508 A * 10/1999 Withers ................. G01V 1/008
166/250.1
2011/0029291 A1 2/2011 Weng et al.
(Continued)

FOREIGN PATENT DOCUMENTS

WO 2012/141720 A1 10/2012

OTHER PUBLICATIONS

Zimmer, "Calculating Stimulated Reservoir Volume (SRV) with Consideration of Uncertainties in Microseismic-Event Locations" CSUG/SPE 148610, 2011.*
(Continued)

*Primary Examiner* — John C Kuan
(74) *Attorney, Agent, or Firm* — John W. Wustenberg; Baker Botts L.L.P.

(57) ABSTRACT

In some aspects, reservoir characterizations of subterranean regions can be enhanced by using realtime fracture matching techniques for capturing the time dependent evolution of fracture parameters based on the occurrence of the time microseismic events generated by stimulation treatments. These microseismic events may further be used to determine hydraulic fracture planes, identify areas of concentration of high density microseismic events, identify and analyze complex fracture networks, and use these and other techniques to enhance the reservoir characterization.

20 Claims, 14 Drawing Sheets

(51) Int. Cl.
| | |
|---|---|
| *G01V 1/28* | (2006.01) |
| *E21B 41/00* | (2006.01) |
| *E21B 43/26* | (2006.01) |
| *E21B 49/00* | (2006.01) |
| *E21B 43/20* | (2006.01) |
| *E21B 43/24* | (2006.01) |

(52) U.S. Cl.
CPC ............. *G01V 1/288* (2013.01); *G01V 1/30* (2013.01); *G01V 1/302* (2013.01); *E21B 41/0057* (2013.01); *E21B 41/0064* (2013.01); *E21B 43/20* (2013.01); *E21B 43/24* (2013.01); *G01V 1/301* (2013.01); *G01V 2210/123* (2013.01); *G01V 2210/1232* (2013.01); *G01V 2210/1234* (2013.01); *G01V 2210/641* (2013.01); *G01V 2210/646* (2013.01); *G01V 2210/74* (2013.01)

(56) References Cited

U.S. PATENT DOCUMENTS

| | | | |
|---|---|---|---|
| 2011/0188347 A1 | 8/2011 | Thiercelin et al. | |
| 2012/0318500 A1 | 12/2012 | Urbancic et al. | |
| 2013/0199789 A1 | 8/2013 | Liang et al. | |
| 2014/0076543 A1 | 3/2014 | Ejofodomi et al. | |
| 2014/0083687 A1 | 3/2014 | Poe et al. | |
| 2014/0372094 A1* | 12/2014 | Holland | G01V 11/00 703/10 |
| 2015/0006082 A1* | 1/2015 | Zhang | G01V 1/306 702/11 |
| 2015/0276979 A1* | 10/2015 | Hugot | G01V 1/301 703/6 |
| 2016/0237338 A1* | 8/2016 | Bianchi | C09K 8/04 |

OTHER PUBLICATIONS

Bai et al., "Mechanical prediction of fracture aperture in layered rocks" Journal of Geophysical Research, vol. 105, No. B1, pp. 707-721, Jan. 10, 2000.*

International Preliminary Report on Patentability issued in related Application No. PCT/US2014/039390, dated Dec. 8, 2016 (12 pages).

Cheng, Yueming. "Impacts of the number of perforation clusters and cluster spacing on production performance of horizontal shale-gas wells." SPE Reservoir Evaluation & Engineering 15.01 (2012): 31-40.

Dusseault, Maurice, John McLennan, and Jiang Shu. "Massive multi-stage hydraulic fracturing for oil and gas recovery from low mobility reservoirs in China." Petroleum Drilling Techniques 39.3 (2011): 6-16.

Maxwell, Shawn C., et al. "Enhanced reservoir characterization using hydraulic fracture microseismicity." SPE Paper 140442, SPE Hydraulic Fracturing Technology Conference. Society of Petroleum Engineers, 2011.

Mayerhofer, Michael J., et al. "What is stimulated reservoir volume?." SPE Production & Operations 25.01 (2010): 89-98.

Williams, Michael J., Bassem Khadhraoui, and Ian Bradford. "Quantitative interpretation of major planes from microseismic event locations with application in production prediction." SEG Paper 20102085, 2010 SEG Annual Meeting. Society of Exploration Geophysicists, 2010.

Zimmer, Ulrich, et al. "Microseismic Quality Control Reports as an Interpretive Tool for Nonspecialists." SPE Paper 110517, SPE Annual Technical Conference and Exhibition. Society of Petroleum Engineers, 2007.

International Search Report and Written Opinion issued in related PCT Application No. PCT/US2014/039390 dated Feb. 25, 2015, 15 pages.

* cited by examiner

ENHANCING RESERVOIR CHARACTERIZATION USING REAL-TIME SRV AND FRACTURE EVOLUTION PARAMETERS

CROSS-REFERENCE TO RELATED APPLICATION

The present application is a U.S. National Stage Application of International Application No. PCT/US2014/039390 filed May 23, 2014, which is incorporated herein by reference in its entirety for all purposes.

BACKGROUND

The present invention relates to monitoring subterranean formations and more particularly, systems and methods for enhancing reservoir characterizations using real-time parameters.

Monitoring of reservoir behavior due to injection and production processes is an important element in optimizing the performance and economics of completion and production operations. Examples of these processes may include hydraulic fracturing, water flooding, steam flooding, miscible flooding, wellbore workover operations, remedial treatments and many other hydrocarbon production activities, as well as drill cutting injection, $CO_2$ sequestration, produced water disposal, and various activities associated with hazardous waste injection. Because the changes in the reservoir may be difficult to resolve with surface monitoring technology, it may be desirable to emplace sensor instruments downhole at or near the reservoir depth in either special monitor wells or within the injection and production wells.

The following description relates to identifying a stimulated reservoir volume (SRV) for a stimulation treatment of a subterranean region. Microseismic data are often acquired in association with injection treatments applied to a subterranean formation. The injection treatments are typically applied to induce fractures in the subterranean formation, and to thereby enhance hydrocarbon productivity of the subterranean formation. The pressures generated by the stimulation treatment can induce low-amplitude or low-energy seismic events in the subterranean formation, and the events can be detected by sensors and collected for analysis. The purpose of the hydraulic fracturing is to induce an artificial fracture into the subsurface, by injecting high pressured fluids and proppants into the rock matrix, in order to enhance the productivity of the reservoir for hydrocarbons.

The microseismic event locations are commonly monitored in real-time and the locations of events shown in a three-dimensional (3D) view may be validated as they occur. They are also available for analysis after the conclusion of the hydraulic fracturing treatment and are thus, available to be compared to the results of other wells in the area. The microseismic events usually occur along or near subsurface fractures that may be either induced or preexisting natural fractures that have been reopened by the hydraulic fracturing treatment. The orientation of the fractures is strongly influenced by the present-day stress regime and also by the presence of fracture systems that were generated at various times in the past when the stress orientation was different from that at the present.

Each separate and distinct microseismic event that is detected and analyzed is the result of a downhole fracture, which has an orientation, magnitude, location, and other attributes that can be extracted from a tiltmeter or seismic sensor data. The fracture may be characterized with other parameters such as length, width, height, and pressure, for example. There is a location uncertainty associated with each microseismic event. This uncertainty is different in the x-y direction than it is in the vertical (z) depth domain. The location uncertainty of each event may be represented by a prolate spheroid.

In some cases, there is an obvious orientation and spacing of microseismic events that follows the classical bi-wing fracture concepts that are often used in mathematical depictions of fracture analysis. In other cases, a dense data cloud, which represents the 3D volume that encompasses all of the microseismic datapoints, is evidence of a complex fracture pattern of induced or reactivated fractures. In these cases, the analysis of the microseismic data becomes very subjective and interpretive. Even in these cases, there are patterns within the data cloud that may be representative of the fracture patterns that are present in the subsurface.

The stress field today may be different from the one at the time of the original fracture creation. The present-day orientation of the induced hydraulic fractures is strongly influenced by the stress rate in the subsurface. There is always some degree of stress anisotropy between the vertical stress and the two horizontal stresses. The greater the anisotropy, the more planar the fractures that are induced by hydraulic fracturing stimulation and the more they will fit the traditional bi-wing model. The greater the permeability of the rock, the more planar the fractures will be. The more isotropic the stress regime, the more the fractures can be easily deflected by discontinuities in the rock and can create a complex fracture network.

Currently, there are several fracture characterization techniques that have been used to try and identify the orientation, dip and spacing of induced and natural fractures.

In one technique, the overall data cloud of microseismic datapoints is identified to build a stimulated reservoir volume, SRV or estimated stimulated volume, ESV. The information is inferred to be a measure of the amount of rock that has been stimulated by the fluids and proppants. Only a small portion of the energy that is pumped into the ground, however, is ever received at the surface as detectable microseismic events.

There are also several different fracture characterization techniques that are able to mathematically associate the microseismic event data with a model of the subsurface and produce a discrete fracture network (DFN) or a set of probably fracture characterizations such as, for example, the techniques described in U.S. Patent Application Publication Nos. 2010/0307755 and 2011/0029291.

These and other techniques however, suffer problems in that the data analysis could be implicated if a microseismic event based on fluid being pumped due to first fracture parameter appears in subsequent fracture parameters. Additionally, the stimulated reservoir volume can be further enhanced by details that correlate the microseismic event data to its real-time analysis.

Figure 1:
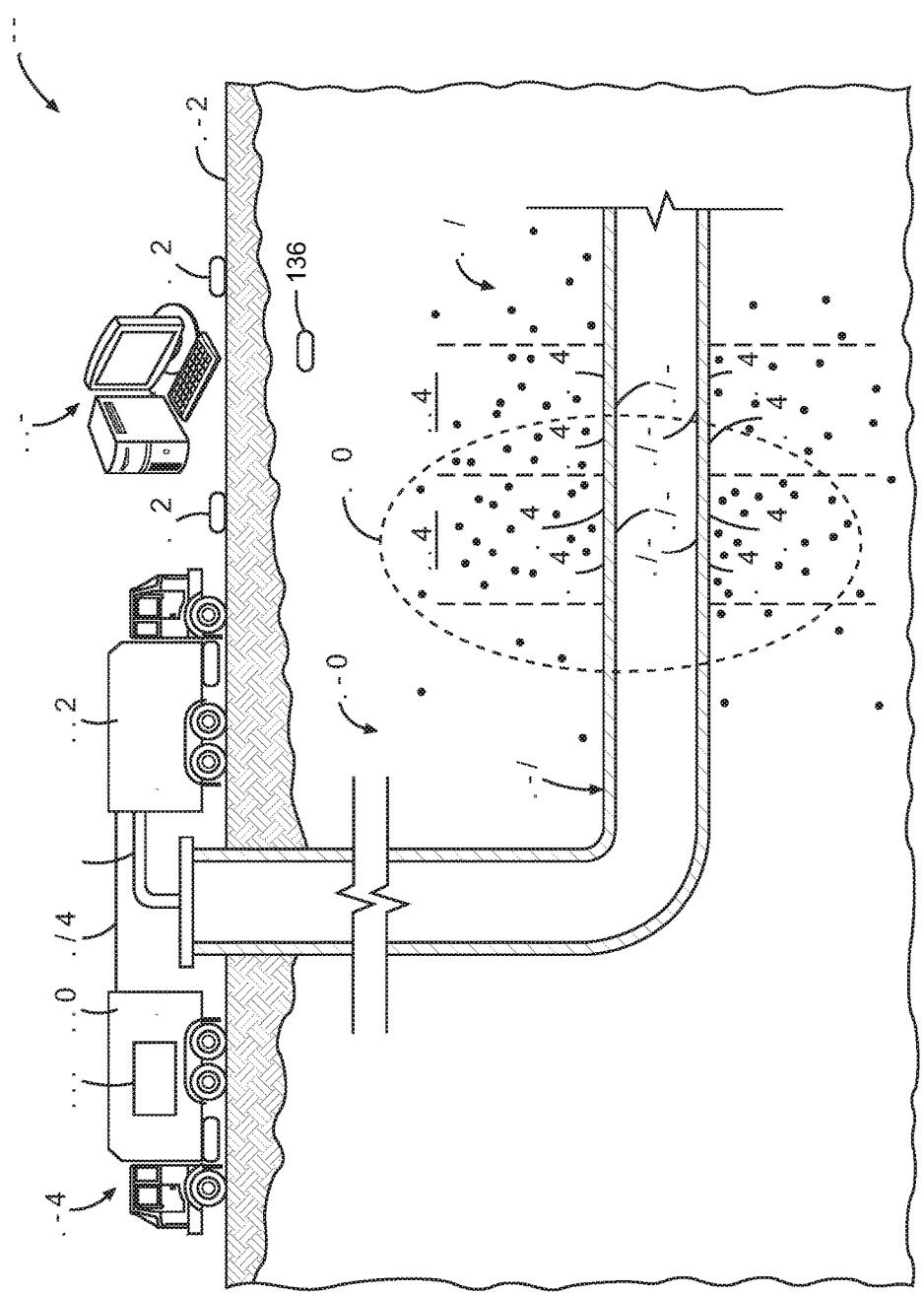
FIG. 1 is a schematic diagram of an example well system.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

In some aspects of what is described here, a stimulated reservoir volume (SRV) for a stimulation treatment is approximated and calculated from microseismic data. In some instances, an SRV uncertainty, an SRV overlap, geometric properties of the SRV, or other types of information are adequately approximated based on calculations from the microseismic data. In some instances, these or other types of information are dynamically identified and displayed, for example, in a real-time fashion during a stimulation treatment. The stimulation treatment can include, for example, an injection treatment, a flow-back treatment, or another treatment. In some instances, the techniques described here can provide field engineers or others with a reliable and direct tool to visualize the stimulated reservoir geometry and treatment field development, to evaluate the efficiency of hydraulic fracturing treatments, to modify or otherwise manage a treatment plan, or to perform other types of analysis or design.

In some instances, the calculated SRV can be proportional to or otherwise indicate the volume of a subterranean region that was fractured, effectively stimulated, or otherwise affected by a stimulation treatment. For example, the calculated SRV may represent the volume in which fractures or fracture networks were created, dilated, or propagated by the stimulation treatment. In some instances, SRV can represent the volume of a subterranean region that was contacted by treatment fluid from the stimulation treatment. In some aspects, the calculated SRV can be obtained based on the volume of a cloud of microseismic events generated by the stimulation treatments. In some implementations, the calculated SRV can be used to evaluate the efficiency of an injection treatment and to assess treatment well performance. In some cases, a more consistent and accurate estimation or prediction of SRV can provide a useful tool for analyzing a stimulated reservoir.

In some implementations, microseismic data can be collected from a stimulation treatment, such as a multi-stage hydraulic fracturing treatment. Based on locations of the microseismic events, a geometrical representation of the SRV can be constructed, and a quantitative representation of the SRV can be calculated based on the geometrical representation. The geometrical representation can include, for example, a three-dimensional (3D) convex hull or a two-dimensional (2D) convex polygon enclosing some or all of the microseismic events. The geometrical representation can include plots, tables, charts, graphs, coordinates, vector data, maps or other geometrical objects. In some implementations, in addition to the volume of the SRV for the stimulated subterranean region, other geometric properties (e.g., a length, width, height, orientation) of the SRV can be identified based on the geometrical representation. The geometric properties can be used to characterize the stimulated subterranean region. For example, the geometrical representation can indicate an extension of hydraulic fractures in the stimulated subterranean formation. In some instances, a stimulated contact area can be identified, for example, by projecting 3D microseismic events onto a reference plane (e.g., a horizontal plane) or by another technique.

In some instances, due to low-amplitude or low-energy microseismic events or low signal-to-noise (SNR) measurements, some uncertainty can be associated with the data for each microseismic event. In some cases, the uncertainty associated with the microseismic events can be used to quantify the uncertainty of the calculated SRV. The uncertainty can include, for example, location, moment (e.g., energy or amplitude), time, or another type of uncertainty associated with the microseismic events. The uncertainty can reflect the accuracy of the SRV estimation. In some cases, the uncertainty can serve as a metric for injection treatment evaluation, treatment plan design, or other types of analysis.

In some implementations, for a multi-stage injection treatment, SRV can be identified for each distinct treatment stage. In some instances, the overlap in SRV between neighboring or geographically close stages can be extracted from the individual SRV of each stage. A total SRV can be derived for the multi-stage injection treatment based on the SRV for each stage, while accounting for the overlap. In some instances, the overlap in SRV between stages indicates fluid connection between hydraulic fractures created by each stage, and may imply diversion of treatment fluid during the hydraulic fracturing process. The extracted SRV overlap and the estimated communication can be used, for example, by field engineers to control the loss of treatment fluid in real-time fashion, to modify the treatment strategy, or otherwise manage the treatment plan. In some cases, the efficiency of a stimulation treatment can indicate the amount of the reservoir (e.g., the amount of the unfractured reservoir) contacted by a given fracture treatment. In some instances, the efficiency can be improved or maximized by reducing or minimizing SRV overlap between two adjacent injection stages. Improving fracturing efficiency via overlap reduction can help reduce costs or provide other benefits in some instances.

In some implementations, the geophysical geometry of the SRV at each stage, the overlapping volumes between adjacent stages, the stimulated contact area, or a combination of these and other types of information can be graphically displayed. The quantity of SRV at each stage, the accuracy or uncertainty of the SRV calculation, an estimate of overlapped volumes, a percentage of the overlapping volumes over the SRV of a treatment stage, or other appropriate quantities can be displayed or otherwise provided, for example, to help field engineers identify the efficiency of the treatment and possible communication between different stages, or other information.

Generally, the techniques described here can be performed at any time, for example, before, during, or after a treatment or other event. In some instances, the techniques described here can be implemented in real time, for example, during a stimulation treatment. Generating or presenting data in real-time may allow well operators or field engineers to visualize the temporal and spatial evolution of the SRV, dynamically identify the geometry of the SRV and control the development of the SRV to maximize the SRV and production. In some instances, physical connection or fluid communication between stimulated regions of multiple stages can be identified in real time and the treatment strategy can be adjusted in real time, for instance, to reduce or avoid loss of treatment fluid, to improve the efficiency of hydraulic fracturing efforts, or to enhance hydrocarbon productivity. In some instances, the real-time SRV analysis can be combined with real-time hydraulic fracture mapping, for example, to provide additional information about the hydraulic fracturing treatment.

FIG. 1 is a diagram of an example well system 100 with a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102, or in other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations of low permeability rock (e.g., shale, coal, or others).

The example well system 100 shown in FIG. 1 includes an injection system 108. The injection system 108 can be used to perform a stimulation treatment that includes, for example, an injection treatment and a flow back treatment. During an injection treatment, fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

A fracture treatment can be applied at a single fluid injection location or at multiple fluid injection locations in a subterranean region, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or any suitable combination of these and others.

The example injection system 108 can inject treatment fluid into the subterranean region 104 from the wellbore 102. The injection system 108 includes instrument trucks 114, pump trucks 116, and an injection treatment control subsystem 111. The example injection system 108 may include other features not shown in the figures. The injection system 108 may apply injection treatments that include, for example, a single-stage injection treatment, a multi-stage injection treatment, a mini-fracture test treatment, a follow-on fracture treatment, a re-fracture treatment, a final fracture treatment, other types of fracture treatments, or a combination of these.

The example injection system 108 in FIG. 1 uses multiple treatment stages or intervals 118a and 118b (collectively "stages 118"). The injection system 108 may delineate fewer stages or multiple additional stages beyond the two example stages 118 shown in FIG. 1. The stages 118 may each have one or more perforation clusters 120. A perforation cluster can include one or more perforations 138. Fractures in the subterranean region 104 can be initiated at or near the perforation clusters 120 or elsewhere. The stages 118 may have different widths, or the stage 118 may be uniformly distributed along the wellbore 102. The stages 118 can be distinct, non-overlapping (or overlapping) injection zones along the wellbore 102. In some instances, each of the multiple treatment stages 118 can be isolated, for example, by packers or other types of seals in the wellbore 102. In some instances, each of the stages 118 can be treated individually, for example, in series along the extent of the wellbore 102. The injection system 108 can perform identical, similar, or different injection treatments at different stages.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The pump trucks 116 may contain multiple different treatment fluids, proppant materials, or other materials for different stages of a stimulation treatment.

The example pump trucks 116 can communicate treatment fluids into the wellbore 102, for example, through a conduit, at or near the level of the ground surface 106. The treatment fluids can be communicated through the wellbore 102 from the ground surface 106 level by a conduit installed in the wellbore 102. The conduit may include casing cemented to the wall of the wellbore 102. In some implementations, all or a portion of the wellbore 102 may be left open, without casing. The conduit may include a working string, coiled tubing, sectioned pipe, or other types of conduit.

The instrument trucks 114 can include mobile vehicles, immobile installations, or other suitable structures. The example instrument trucks 114 shown in FIG. 1 include an injection treatment control subsystem 111 that controls or monitors the stimulation treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment.

The instrument trucks 114 can include mobile vehicles, immobile installations, or other suitable structures. The example instrument trucks 114 shown in FIG. 1 include an injection treatment control subsystem 111 that controls or monitors the stimulation treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment.

The example injection treatment control subsystem 111 shown in FIG. 1 controls operation of the injection system 108. The injection treatment control subsystem 111 may include data processing equipment, communication equipment, or other systems that control stimulation treatments applied to the subterranean region 104 through the wellbore 102. The injection treatment control subsystem 111 may include or be communicably linked to a computing system (e.g., the computing subsystem 110) that can calculate, select, or optimize fracture treatment parameters for initialization, propagation, or opening fractures in the subterranean region 104. The injection treatment control subsystem 111 may receive, generate or modify a stimulation treatment plan (e.g., a pumping schedule) that specifies properties of a stimulation treatment to be applied to the subterranean region 104.

The stimulation treatment, as well as other activities and natural phenomena, can generate microseismic events in the subterranean region 104. In the example shown in FIG. 1, the injection system 108 has caused multiple microseismic events 132 during a multi-stage injection treatment. A subset 134 of microseismic events is shown inside a circle. In some implementations, the subset 134 of microseismic events is associated with a single treatment stage (e.g., treatment stage 118a) of a multi-stage injection treatment. In some implementations, the subset 134 of microseismic events can be identified based on the time that they occurred, and the subset 134 can be filtered or otherwise modified to exclude outliers or other event points. The subset 134 of microseismic events can be selected from a superset of microseismic events based on any suitable criteria. In some cases, the subset 134 of microseismic events is used to identify an SRV for the stage 118a or another aspect of an injection treatment.

The microseismic event data can be collected from the subterranean region 104. For example, the microseismic data can be collected by one or more sensors 136 associated with the injection system 108, or the microseismic data can be collected by other types of systems. The microseismic information detected in the well system 100 can include acoustic signals generated by natural phenomena, acoustic signals associated with a stimulation treatment applied through the wellbore 102, or other types of signals. For instance, the sensors may detect acoustic signals generated by rock slips, rock movements, rock fractures or other events in the subterranean region 104. In some instances, the locations of individual microseismic events can be determined based on the microseismic data. Microseismic events in the subterranean region 104 may occur, for example, along or near induced hydraulic fractures. The microseismic events may be associated with pre-existing natural fractures or hydraulic fracture planes induced by fracturing activities.

The wellbore 102 shown in FIG. 1 can include sensors 136, microseismic array, and other equipment that can be used to detect microseismic information. The sensors 136 may include geophones or other types of listening equipment. The sensors 136 can be located at a variety of positions in the well system 100. In FIG. 1, sensors 136 are installed at the surface 106 and beneath the surface 106 (e.g., in an observation well (not shown)). Additionally or alternatively, sensors may be positioned in other locations above or below the surface 106, in other locations within the wellbore 102, or within another wellbore (e.g., another treatment well or an observation well). The wellbore 102 may include additional equipment (e.g., working string, packers, casing, or other equipment) not shown in FIG. 1.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, the sensors 136 may communicate with the instrument trucks 114 or the computing subsystem 110 through wired or wireless links or networks, or the instrument trucks 114 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a stimulation treatment of a subterranean region 104. Microseismic data from a stimulation treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 136. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data, for example, by a wired or wireless communication link, by a wired or wireless network, or by one or more disks or other tangible media.

The computing subsystem 110 can perform, for example, fracture mapping and matching based on collected microseismic event data to identify fracture orientation trends and extract fracture network characteristics. The characteristics may include fracture orientation (e.g., azimuth and dip angle), fracture size (e.g., length, height, surface area), fracture spacing, fracture complexity, stimulated reservoir volume (SRV), or another property. In some implementations, the computing subsystem 110 can identify SRV for a stimulation treatment applied to the subterranean region 104, calculate an uncertainty of the SRV calculation, identify overlapping volume of SRV between stages of a stimulation treatment, or other information. The computing subsystem 110 can perform additional or different operations.

In one aspect of operation, the injection system 108 can perform an injection treatment, for example, by injecting fluid into the subterranean region 104 through the wellbore 102. The injection treatment can be, for example, a multi-stage injection treatment where an individual injection treatment is performed during each stage. The injection treatment can induce microseismic events in the subterranean region 104. Sensors (e.g., the sensors 136) or other detecting equipment in the well system 100 can detect the microseismic events, and collect and transmit the microseismic event data, for example, to the computing subsystem 110. The computing subsystem 110 can receive and analyze the microseismic event data. For instance, the computing subsystem 110 may identify an SRV or other data for the injection treatment based on the microseismic data. The SRV data may be computed for an individual stage or for the multi-stage treatment as a whole. In some instances, the computed SRV data can be presented to well operators, field engineers, or others to visualize and analyze the temporal and spatial evolution of the SRV. In some implementations, the microseismic event data can be collected, communicated, and analyzed in real time during an injection treatment. In some implementations, the computed SRV data can be provided to the injection treatment control subsystem 111. A current or a prospective treatment strategy can be adjusted or otherwise managed based on the computed SRV data, for example, to improve the efficiency of the injection treatment.

Some of the techniques and operations described here may be implemented by a computing subsystem configured to provide the functionality described. In various embodiments, a computing system may include any of various types of devices, including, but not limited to, personal computer systems, desktop computers, laptops, notebooks, mainframe computer systems, handheld computers, workstations, tablets, application servers, storage devices, computing clusters, or any type of computing or electronic device.

Figure 2:
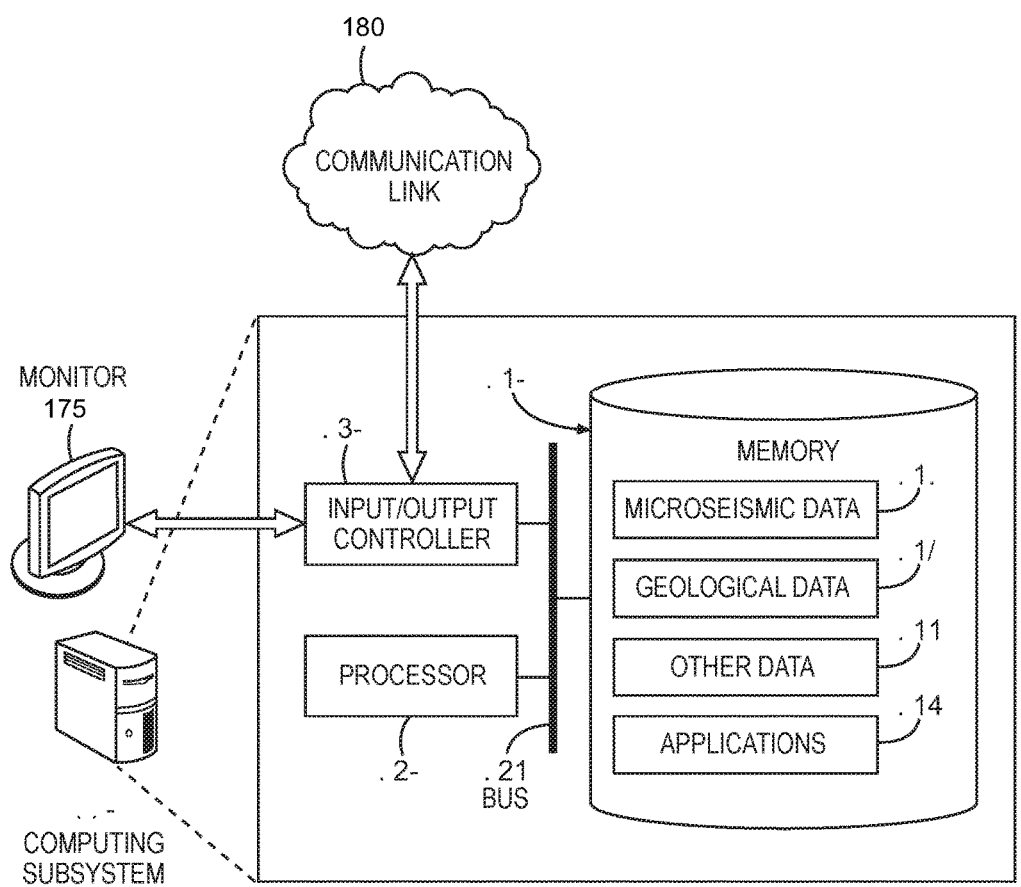
FIG. 2 is a diagram of the example computing subsystem 110 of FIG. 1

FIG. 2 is a diagram of the example computing subsystem 110 of FIG. 1. The example computing subsystem 110 can be located at or near one or more wells of the well system 100 or at a remote location. All or part of the computing subsystem 110 may operate independent of the well system 100 or independent of any of the other components shown in FIG. 1. The example computing subsystem 110 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 2, the example memory 150 includes microseismic data 151, geological data 152, other data 155, and applications 158. In some implementations, a memory of a computing device includes additional or different data, applications, models, or other information.

The microseismic data 151 can include information on microseismic events in a subterranean area. For example, the microseismic data 151 can include information based on acoustic data detected at the wellbore 102, at the surface 106, or at other locations. The microseismic data 151 can include information collected by sensors 136. In some cases, the microseismic data 151 includes information that has been combined with other data, reformatted, or otherwise processed. The microseismic event data may include any suitable information relating to microseismic events (e.g., locations, times, magnitudes, moments, uncertainties, etc.). The microseismic event data can include data collected from one or more stimulation treatments, which may include data collected before, during, or after a fluid injection.

The geological data 152 can include information on the geological properties of the subterranean zone 104. For example, the geological data 152 may include information on the wellbore 102, or information on other attributes of the subterranean region 104. In some cases, the geological data 152 includes information on the lithology, fluid content, stress profile, pressure profile, spatial extent, or other attributes of one or more rock formations in the subterranean area. The geological data 152 can include information collected from well logs, rock samples, outcroppings, microseismic imaging, or other data sources.

The applications 158 can include software applications, scripts, programs, functions, executables, or other modules that are interpreted or executed by the processor 160. The applications 158 may include machine-readable instructions for performing one or more of the operations related to FIGS. 2-13. The applications 158 may include machine-readable instructions for generating a user interface or a plot, for example, illustrating fracture geometry (e.g., length, width, spacing, orientation, etc.), geometric representations of SRV, SRV overlap, SRV uncertainty, etc. The applications 158 can obtain input data, such as treatment data, geological data, microseismic data, or other types of input data, from the memory 150, from another local source, or from one or more remote sources (e.g., via the communication link 180). The applications 158 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 158 by executing or interpreting the software, scripts, programs, functions, executables, or other modules contained in the applications 158. The processor 160 may perform one or more of the operations related to the figures disclosed herein. The input data received by the processor 160 or the output data generated by the processor 160 can include any of the microseismic data 151, the geological data 152, or the other data 155.

An example process for analyzing the SRV based on microseismic event data is represented in the plots and corresponding description of FIGS. 3-5, 9A-15B. In some implementations, SRV can be represented geometrically in one dimension, two dimensions, three dimensions, or another representation. The geometrical representation can be of any appropriate shape, for example, including a rectangle, a circle, a polygon, a sphere, an ellipsoid, a polyhedron, a combination of them, etc. The geometrical representation can have any suitable property (e.g., regular, irregular, closed, open, convex, concave, non-convex, non-concave, etc.). As an example, the geometrical representation can include a boundary (e.g., a surface, a 3D convex hull, a 2D polyhedron, etc.) enclosing multiple microseismic event locations.

In some instances, computing a boundary based on microseismic event data can include filtering the collected microseismic event data to identify a selected subset of microseismic events. In some implementations, the microseismic events can be filtered based on the time, location, magnitude, moment, or another attributes of the microseismic events. In some instances, the microseismic events can be filtered according to their associated treatment stage. In some instances, the microseismic events can be filtered to exclude outliers, low density events, or a combination of these and other events. The selected subset of microseismic events can be used to calculate the boundary to represent the SRV for a stimulation treatment.

In some implementations, computing the boundary can include calculating an initial boundary based on multiple microseismic events (e.g., events at extreme locations). The boundary can be used to identify an SRV for a stimulation treatment. For instance, the internal volume of the boundary can be calculated as the SRV for the stimulation treatment.

In some instances, the microseismic events can be associated with a single stage of a multi-stage injection treatment. For example, when there are n microseismic events detected during a stage of a hydraulic fracture treatment, each microseismic event can be represented as a location. The microseismic events may be located in the production pay zone, contributing to the SRV, or other locations.

Figure 3:
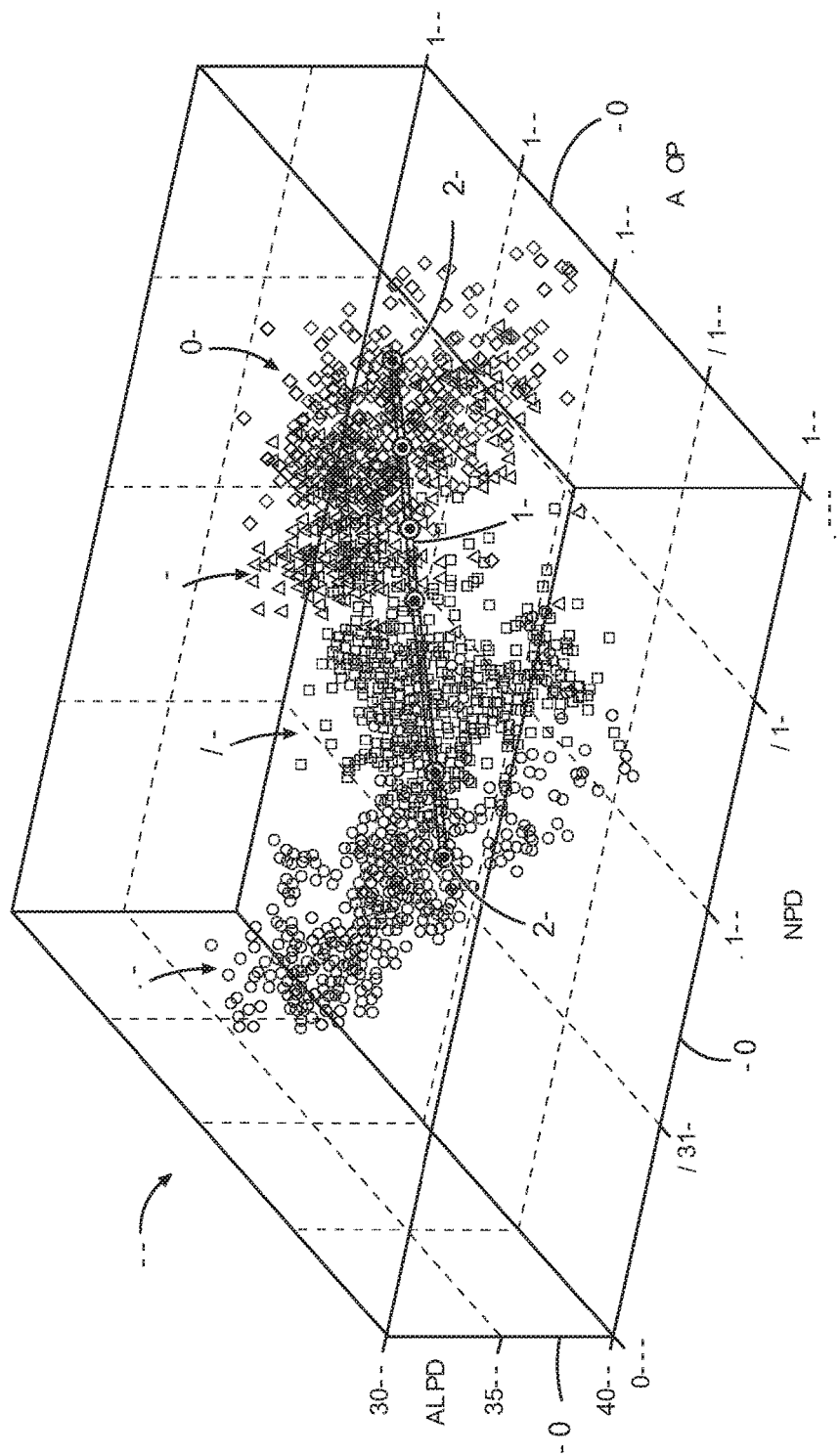
FIG. 3 is a plot showing an example microseismic event data collected from a multi-stage injection treatment.

In FIG. 3, the example plot 300 shows the microseismic event data in a three-dimensional rectilinear coordinate system. The coordinate system is represented by the vertical axis 304a and two horizontal axes 204b and 204c. In the example plot 300, the vertical axis 304a represents a range of depths in a subterranean zone; the horizontal axis 304b represents a range of East-West coordinates; and the horizontal axis 304c represents a range North-South coordinates (all in units of feet).

In some instances, a multi-stage injection treatment can be applied to a subterranean region. The multi-stage injection treatment may include individually treated stages and microseismic event data can be obtained for each stage. In some implementations, the example process described above for analyzing the SRV can be applied to the microseismic event data associated with each individual stage. For example, the microseismic event data associated with each individual stage can be filtered (e.g., to exclude outliers, low density events, etc.) and analyzed (e.g., for computing a boundary to enclose a subset of the microseismic events associated with each stage, identifying an SRV for each stage based on the computed boundary, etc.). In some instances, physical connection or fluid communication may exist between stimulated regions of multiple stages. The SRVs for two or more stages may overlap with each other. The overlapping volume of SRVs and the overlap of boundaries can be identified based on the microseismic event data. In some implementations, a total SRV for the multi-stage injection treatment can be identified based on the SRV for each stage and the overlapping volume between stages.

FIG. 3 is a plot 300 showing example microseismic event data collected from a multi-stage hydraulic fracturing treatment. In some implementations, a multi-stage hydraulic fracturing strategy can be used in long horizontal wells to improve stimulated reservoir volume. Microseismic event data can be collected at each stage of the multi-stage fracturing treatment. The example plot 300 shows a subset 310 that includes 770 microseismic events (shown as circles) at Stage 1, a subset 320 that includes 1201 events (shown as squares) at Stage 2, a subset 330 that includes 476 events (shown as triangles) at Stage 3, and a subset 340 that includes 424 events (shown as diamonds) at Stage 4. A wellbore 350 and perforation clusters 360 for the example four-stage hydraulic fracturing treatment are also shown in FIG. 3.

Figure 4:
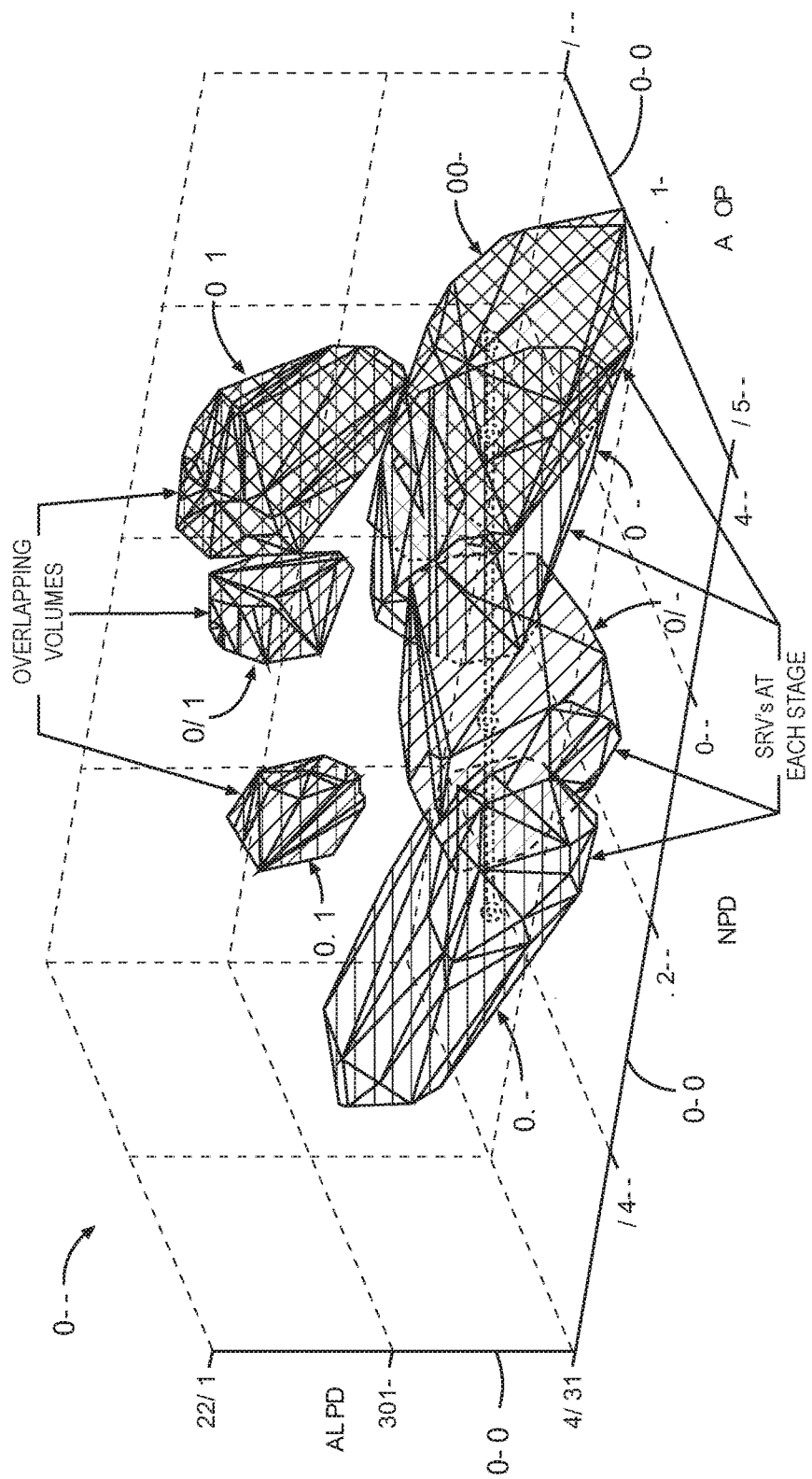
FIG. 4 is a plot showing a three-dimensional representation of overlapping stimulated reservoir volumes (SRVs) associated with respective stages of a multi-stage injection treatment.

FIG. 4 is a plot 400 showing a three-dimensional (3D) representation of overlapping SRVs associated with distinct stages of a multi-stage injection treatment. In the illustrated plot 400, the boundaries 410, 420, 430, and 440 are constructed based on the events subsets 310, 320, 330, and 340 in FIG. 3, respectively. The boundaries can be constructed according to the example known techniques. In the example shown in FIG. 4, the SRVs associated with the four stages are 7.83 $(10)^8$, 9.56 $(10)^8$, 7.74 $(10)^8$ and 8.73 $(10)^8$ cubic feet (ft$^3$) respectively. The vertical axis is 404a, and two horizontal axes are 404b and 404c.

In some instances, the total SRV for a multi-stage hydraulic fracturing treatment is not directly obtained from the individual SRV quantities of each stage. For example, there may be overlapping volumes between the stages. FIG. 4 shows boundaries 415, 425, and 435 of SRV overlap regions between Stage 1 and Stage 2, Stage 2 and Stage 3, and Stage 3 and Stage 4, respectively. In some cases, in addition to neighboring stages, geographically close stages can also overlap or otherwise affect each other. For example, Stage 1 and Stage 4 may overlap with or otherwise influence each other. In some implementations, the overlapped volumes indicate possible fluid communication between the stages during the hydraulic fracturing process. Such communications may include the diversion of treatment fluid and may decrease the efficiency of an individual hydraulic fracturing treatment.

An example process for approximating or otherwise identifying overlapping volumes between treatment stages is described as follows. In some implementations, a first phase of the process can include identifying microseismic events shared by two stages. Such events lie inside boundaries of both stages and thus are inside the overlapping volume. For example, to determine the SRV overlap 415 between Stage 1 and Stage 2 in FIG. 4, the events at Stage 1 that also lie inside the boundary 420 of Stage 2 can be identified. In some implementations, all events enclosed by the boundary 410 of Stage 1 can be scanned. For each event at Stage 1, the facets of the boundary 420 of Stage 2 can be scanned. For each facet of the boundary 420, whether the event and the center of the boundary 420 lie on the same side of the facet can be determined. In some instances, such a determination can be made by assessing whether a product of their respective distances to the facet is positive. If positive, the event and the center are on the same side; if negative, the event and the center are on opposite sides. In some cases, if the event and the center lie on the same side of each considered facet for all the facets of the boundary 420, the event can be identified as being shared by the two stages. Similarly, the above process can be applied to identify the events at Stage 2 which also lie inside the boundary 410 of Stage 1. After this phase, a set of events commonly shared by the two stages can be found.

In some implementations, a phase of the process can include calculating a geometrical object (e.g., a convex hull or another type of object) based on the microseismic events identified in the first phase and intersected points found in the second phase. The boundary can be calculated according to the known techniques. The boundary can represent the overlapping volume between two stages. As shown on the top area of FIG. 4, the boundaries 415, 425, and 435 are the SRV overlaps between two adjacent stages among the four stages. The volumes of these overlapping parts are 8.56 $(10)^7$, 9.09 $(10)^7$ and 4.16 $(10)^8$ cubic feet (ft$^3$), occupying 9.0%, 11.7% and 47.7% of SRVs of Stage 2, Stage 3 and Stage 4, respectively. The overlapping volumes among Stage 3 and its two adjacent stages (Stage 2 and Stage 4) is 5.07 $(10)^8$ ft$^3$, occupying 65.5% of SRV of Stage 3.

The total effective SRV for a multi-stage hydraulic fracturing treatment can be calculated based on the overlapping volume. For example, the total effective SRV for a two-stage treatment can be calculated by equation (6):

Total ESRV(stage1 $u$ stage2)=SRV(stage1)+SRV(stage2)−SRV(stage1∩stage2)

Generally, the total effective SRV for am-stage hydraulic fracturing treatment can be, for example, given by equation:

$$\text{Total } ESRV\left(\bigcup_{i=1}^{m} \text{stage}(i)\right) = \sum_{i=1}^{m} SRV(\text{stage}(i)) - \sum_{i>j} SRV(\text{stage}(i) \cap \text{stage}(j)) + \sum_{i>j>k} SRV(\text{stage}(i) \cap \text{stage}(j) \cap \text{stage}(k)) - \ldots + (-1)^m SRV\left(\bigcap_{i=1}^{m} \text{stage}(i)\right)$$

Figure 7:
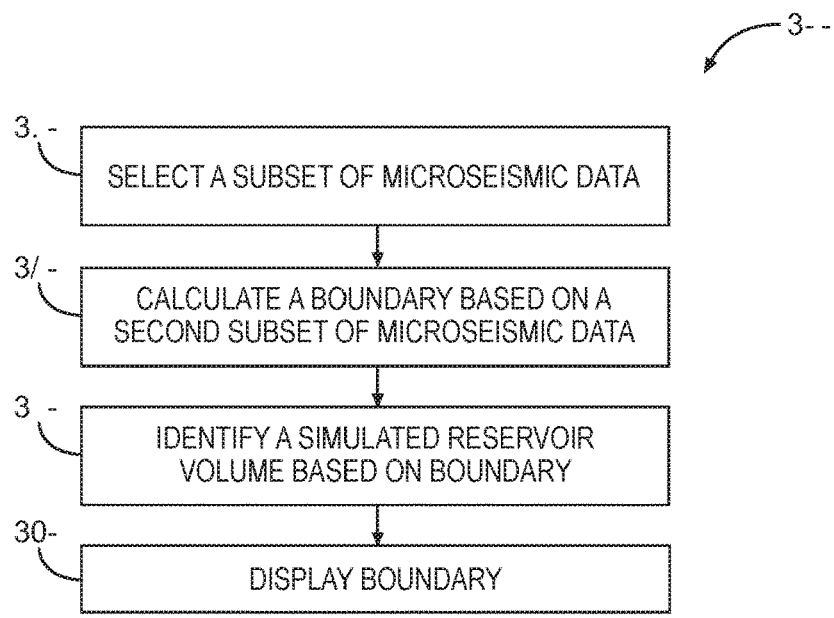
FIG. 7 is a flow chart showing an example technique for identifying an SRV from microseismic data.

In the example illustrated in FIG. 7, the total volume for the multi-stage treatment is 2.79 $(10)^9$ (ft$^3$). In some implementations, the total SRV can be calculated according to a variation of the equations above, or in another manner.

Figure 5:
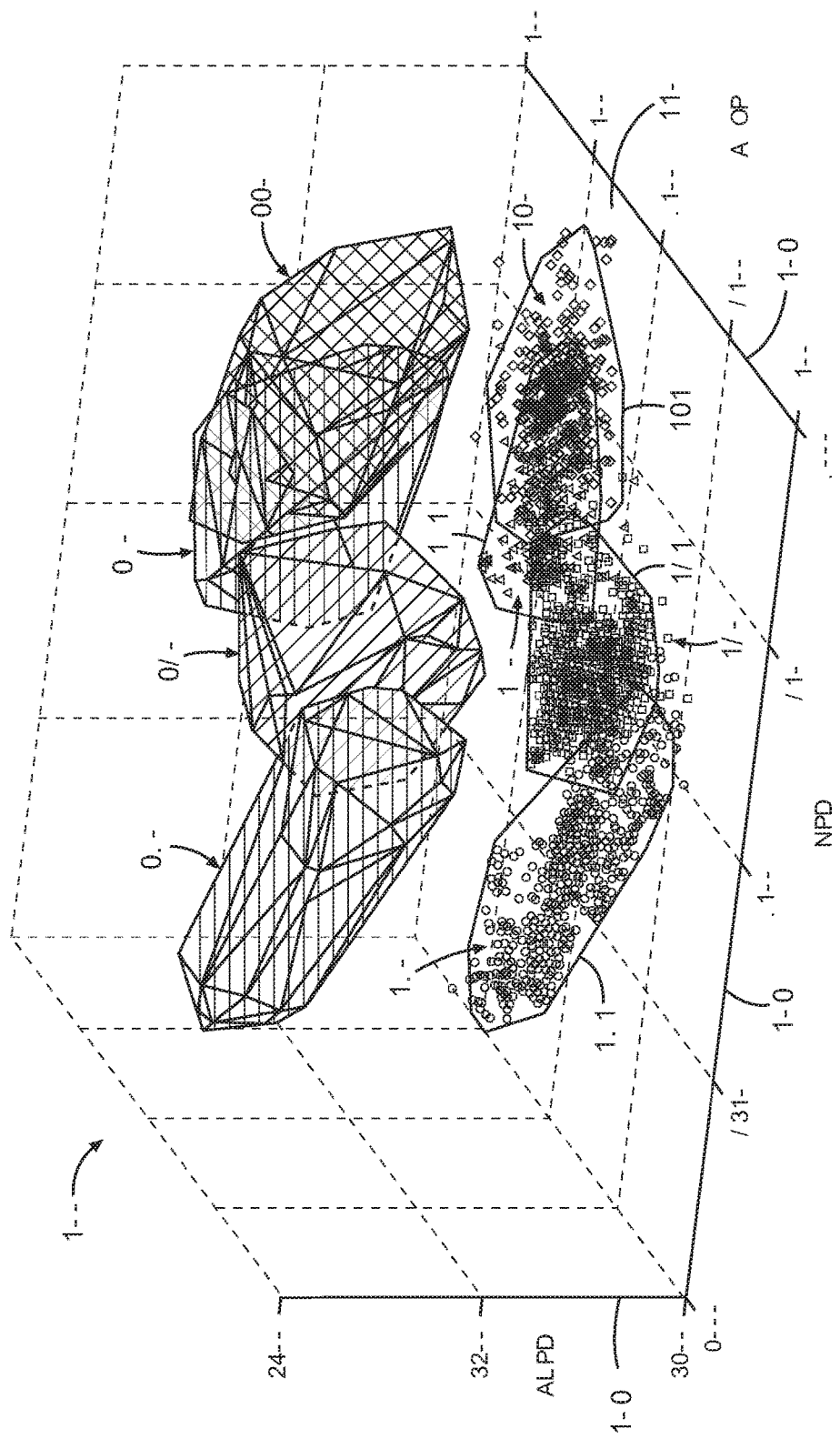
FIG. 5 is a plot showing a two-dimensional representation of the overlapping SRVs shown in the plot 700 in FIG. 7.

FIG. 5 is a plot 500 showing a two-dimensional (2D) projection of microseismic events of a multi-stage injection treatment and example two-dimensional geometrical representations of stimulated contact areas. In the illustrated example, four sets of projected microseismic events 510, 520, 530, and 540 can be obtained by projecting the 3D microseismic events in the subsets 310, 320, 330, and 340 of FIG. 3 onto a horizontal reference plane 550, respectively. Based on the four sets of 2D microseismic data, the four boundaries 515, 525, 535, and 545 can be constructed. The example boundaries 515, 525, 535, and 545 are 2D convex polygons. Other types of two-dimensional boundaries can be computed. The sizes of the polygons can represent the stimulated area contacting the subterranean region. A 2D convex polygon can be calculated in a manner that is analogous to the process of constructing a 3D convex hull, or in another manner. In some other implementations, the 2D boundaries may be obtained by projecting the constructed 3D boundaries 410, 420, 430, and 440 onto the reference plane 550. In some implementations, the 2D geometrical representation of the stimulated contact area can be of a different shape and may be calculated using another technique.

In some instances, analysis and estimation of SRV can be performed in real time, for example, during the collection of microseismic events. The example techniques described here can be applied, for example, to a real-time hydraulic fracturing process, for multi-stage completions with multiple perforation clusters in a stage, or in other contexts.

In some cases, stimulated volumes can start and emit from perforation points on the wellbore. As such, at an initial phase of treatment, each perforation cluster may be surrounded by a local region of stimulated rock. As the hydraulic fracturing process evolves, the local regions of stimulated rock can gradually grow. In some instances, several local regions or paths of stimulated rock can merge, and eventually form a larger volume of stimulated rock.

As an example aspect of operation, an algorithm for computing SRV in real time includes obtaining input information related to the perforation clusters at each stage, for example, including the number of perforations, location of each perforation, distance between two adjacent perforations, or other information. At the initial time period of the hydraulic fracturing treatment, as a new microseismic event is detected, the distance from this event to each perforation can be calculated. The event can be associated with the perforation that has the minimum distance to the event and the event can be a supporting event of the perforation.

In some implementations, the algorithm can start to generate an SRV related to a perforation when a minimum number of supporting events of the perforation have been accumulated. For instance, the minimum number of supporting events can be four. With the four supporting events, a tetrahedron can be constructed; the tetrahedron can represent the initial local region of stimulated rock associated with the perforation. In some aspects of implementations, once a local region associated with a perforation is identified, the perforation can be defined as the center of the local region, or the center of the local region may be defined otherwise.

When a new event appears on the buffer, it can be associated with the center or the perforation. In some instances, there may be three cases: a) a distance from the event to the center is larger than the distance from the center to its adjacent center; otherwise, the following two cases can be considered: b) the event lies outside the local region; c) the event lies within the local region. In case c), the new event does not affect the local region. In case b), the new event can make the local region propagate into its surroundings and grow. In some implementations, the new event can become a vertex of an expanded boundary, for example, based on an example process described below. In case a), the local region can be merged with its neighbor, for example, a local region or events associated with its adjacent perforation. In a next level, the algorithm can merge the events associated with two adjacent centers or perforations and then use the set of merged events to construct a larger boundary (e.g., a convex hull, or another type of boundary) to represent the stimulated rock region that contains the merged events. The center of the new boundary can be the average of the set of the two adjacent centers or perforations. In some implementations, as long as new events are being detected, the recurrent process can be applied until the boundaries associated with the perforations are merged into a common boundary. In some implementations, during the accumulation of microseismic events, the algorithm can enable users to visualize the temporal and spatial evolution of the stimulated rock region and their merging processes.

In some implementations, the boundary can enclose all detected microseismic events. The center of the boundary can be the average of its vertices or another location. When a new event is detected, if the event lies inside the local region, it does not affect the local region; otherwise, it can make the local region propagate into its surroundings and grow into a larger region. In some instances, the latter situation can include two cases.

In some implementations, experience shows that the accuracy of the SRV estimation becomes more accurate as more microseismic events accumulate. In some instances, removing outliers and events with low density can help refine the geometrical object constructed based on the microseismic events and improve the accuracy of SRV estimation. For instance, especially at early times of real-time SRV estimation, removing outliers and low density events can reduce or eliminate interference introduced by the outliers and low density events which are reflections of activities other than the considered injection treatment. In some instances, the real-time SRV calculation algorithm can monotonically increase the SRV estimation accuracy as the microseismic events accumulate and can help maximize the SRV estimation accuracy.

In some instances, in addition to the volume, other geometric properties of a stimulated subterranean region can be estimated or otherwise identified based on microseismic events as well. The geometric properties can include, for example, a length, width, height, orientation, or another attribute of the SRV for the stimulated region. In some instances, these geometric properties can provide a more adequate and concrete description of the SRV and an overall fracture network within the stimulated reservoir. In some instances, more information of the stimulation region can be extracted based on the geometric properties. Field engineers, operational engineers and analysts, and others can better visualize, learn, or otherwise analyze the subterranean region, and can manage the stimulation treatment accordingly.

In some implementations, the geometric properties of the SRV for the stimulated region can be identified based on a computed SRV boundary. For instance, a major axis of the SRV can be identified based on the SRV boundary. The major axis can include information regarding, for example, lateral extension and orientation as well as the development of the stimulated region. For example, the major axis may reflect the extension and orientation of the primary fractures of the fracture network inside the stimulated region. Additional or different geometric properties and information can be identified based on the SRV boundary.

The SRV boundary can include, for example, a sphere, a cube, an ellipsoid, a cylinder, a polyhedron, or another geometrical object. As a specific example, the SRV boundary can include an ellipsoid. The geometric properties of the ellipsoid can be used to quantify and characterize the geometric properties of the stimulated region and the fracture network inside the stimulated region. For instance, an ellipsoid in a Cartesian coordinate system can be characterized by nine parameters that include, a center, semi-lengths of x-axis, y-axis and z-axis, and rotation angles along these axes. In some implementations, the lengths of semi-axes can be used to approximate or otherwise represent the length, width and height of the SRV for the stimulated region and the rotation angles can be used to characterize the orientation of the SRV for the stimulated region. In some implementations, additional or different parameters can be selected to describe the geometric properties of the stimulated region.

Various algorithms and methods can be used to construct an ellipsoid based on the microseismic event locations associated with a stimulation treatment. One example approach can involve fitting an ellipsoid to a set of microseismic event locations. As a specific example, the set of locations can include the vertices of a computed SRV boundary (e.g., a convex hull). The ellipsoid can be computed according to a least square method such that the distances between the ellipsoid and the vertices of the convex hull are minimized. The ellipsoid can be computed based on additional or different principles or techniques.

The microseismic event determination can further enhance the fracture network characterization by using additional detailed information and data related to the stimulated subterranean region by implementing a real-time analysis of 4D (events' occurrence time) for the microseismic events. By adding the time (and even spatial coordinates), fracture network characterization can be enhanced and an improved understanding of the stimulation may be identified for the stimulated subterranean region. The visualization integrating time-dependent dynamical evolutions of hydraulic fracture patterns, stimulated subterranean region and fractured rock geometry may help an engineer or operator analyze and control the real-time development of stimulation treatments for hydraulic fracturing, adjust the stimulation or fracturing strategy, optimize the subterranean region exploration, and enhance the hydrocarbon productivity.

Hydraulic fracturing technology such as that described herein may be used to inject treatments into a subterranean formation to induce artificial fractures. In some implementations, the treatments can be performed using multistage injection treatments which create multiple perforation clusters in each stage in an attempt to maximize the stimulated reservoir volume. Microseismic event data is associated with such processes. The analysis of post-job 3D microseismic data provides the basic geometric characterization of hydraulic fracture networks and fracture properties for the stimulated subterranean region which can predict the fracture properties and performance of the well by predicting the hydrocarbon production for the stimulated subterranean region. The analysis is based on the optimal match approach to identify the dominant fracture orientations and extract hydraulic fracture patterns embedded in the clouds of acquired 3D spatial microseismic events. The geometric information includes fracture azimuth, fracture dip angle, fracture size (length, height, area), fracture spacing density and network's complexity as examples.

With the addition of the disclosure herein, a realtime analysis on the 4D (spatial coordinates and occurrence time of the microseismic events) can be included in the determination of the properties of the fractured subterranean region. The real time data analysis allows for capturing the time-dependent dynamical evolution of fracture properties (length, height, area), the accumulation process of microseismic events, the seismic moment distribution, stimulated reservoir areas and volumes. The detailed real-time fracture evolution, stimulated reservoir contact area and fractured rock volume further enhance the stimulated reservoir characterization and better understand the impact of stimulation of unconventional treatment reservoirs. The integration and incorporation of the accurate and objective data into complex fracture propagation models and unconventional reservoir models helps to accurately analyze the performance of stimulated well, predict hydrocarbon production generated by the fractured reservoirs and optimize the hydraulic fracturing program.

In some instances, the microseismic events, the fractures, and the SRV boundary can be computed and displayed in real time based on microseismic data. In some implementations, the development of the hydraulic fractures and the SRV can be approximated and tracked. In some instances, the user can visualize, for example, the propagation or growth direction, the width, the shape, or another attribute of the hydraulic fractures and the SRV. The graphic realization of the identified SRV boundary and hydraulic fractures can provide the user a direct and intuitive tool to understand the subterranean region, and evaluate, control, design, or otherwise manage the stimulation treatment. For instance, through the visualization, whether the fractures intersect or will intersect the wellbore 1550 at unexpected points or whether the fractures divert from their expected direction can be determined. In these cases, preventive actions can be taken to control the developments of the fracture network and the stimulated region. Additional or different information can be observed or otherwise extracted based on the visualization.

Figure 6:
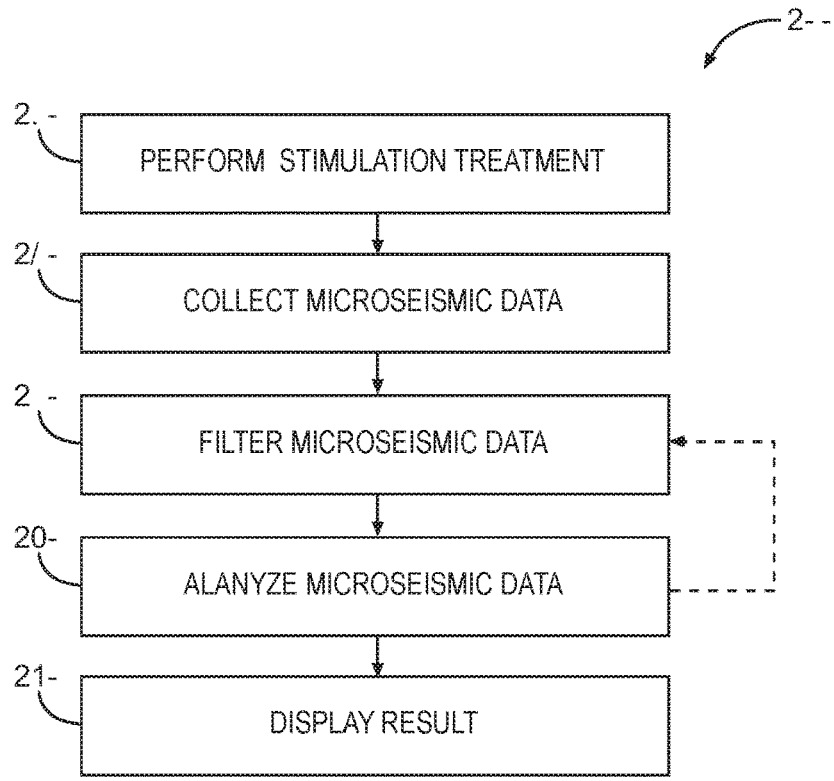
FIG. 6 is a flow chart showing an example technique for processing microseismic data.

FIG. 6 is a flow chart showing an example process 600 for processing microseismic data. All or part of the example process 600 may be computer-implemented, for example, using the features and attributes of the example computing subsystem 110 shown in FIG. 2 or other computing systems. The process 600, individual operations of the process 600, or groups of operations may be iterated or performed simultaneously to achieve a desired result. In some cases, the process 600 may include the same, additional, fewer, or different operations performed in the same or a different order. The process 600 may be performed on site near a wellbore, at a remote location, or in another location.

At 620, microseismic data can be collected. The microseismic data can be collected, for example, by sensors (e.g., sensors 136 in FIG. 1) or data collection apparatus of an injection treatment system. The microseismic data can be collected before, during, or after a stimulation treatment 610 or at another time. In some implementations, the microseismic event data can be collected in real time (or substantially in real time) during a stimulation treatment 610. For example, the microseismic data may be collected at individual stages of a multi-stage injection treatment. The microseismic data can include any suitable information of microseismic events associated with a stimulation treatment 610 of a subterranean region. In some aspects of implementations, the microseismic data can be stored in a memory (e.g., memory 150) of a computing system for storage or further processing.

In some instances, microseismic events may have low-amplitude or low-energy (e.g., with the value of the log of the intensity or moment magnitude of less than three), or a low signal-to-noise ratio (SNR). Some uncertainty, inaccuracy, or measurement error can be associated with the event locations. For example, the uncertainty can include a location uncertainty, a moment (e.g., amplitude or energy) uncertainty, a time uncertainty (e.g., the uncertainty related to associating an event with a particular treatment stage), or a combination of these and other types of uncertainty.

At 630, microseismic data can be filtered. The microseismic data can be filtered based on times, locations, uncertainties, magnitude, moment, energy, event density, or a combination of these and other attributes of the microseismic events. In some implementations, the microseismic data can include microseismic events associated with multiple stages of a stimulation treatment. The microseismic data can be filtered, for example, by grouping microseismic events associated with respective stages of the multi-stage injection treatment. In some aspects, the microseismic data associated with the entire multi-stage injection treatment can form a superset of microseismic events; the microseismic events associated with each stage can form a respective subset. In some implementations, the microseismic data can be filtered by removing outliers from a subset, a superset, or another set of microseismic events. In some instances, the outliers can include deterministic outliers, statistical outliers, or another type of outliers. The outliers can include one or more microseismic events with locations outside a range, with uncertainty beyond a threshold, with amplitude, energy, or event density below a threshold, or with other outlier attributes. The outliers can be filtered by removing the microseismic events exceeding an attribute threshold, beyond certain statistical deviation, etc.; or outliers can be filtered in another manner. In some implementations, the attribute threshold (e.g., density threshold, distance threshold, moment threshold, etc.) can be a user input control parameter or it can be configured automatically, for example, by data processing apparatus, based on system setup, reservoir property, treatment plan, or a combination of these and other parameters.

At 640, microseismic data can be analyzed. In some implementations, the analysis can be performed based on the filtered microseismic data. In some implementations, analyzing the microseismic data can include identifying stimulated reservoir geometry, calculating an SRV for a stimulation treatment, identifying uncertainty of an SRV, fracture mapping and matching, or another type of processing. As an example, analyzing the microseismic data includes constructing a boundary of microseismic events and calculating an SRV based on the boundary. In some instances, uncertainty can be associated with the microseismic events. In this case, uncertainty associated with the SRV calculation can be identified based on the uncertainty of the microseismic events. Some example microseismic data analysis techniques are described with respect to FIGS. 3-5 and FIGS. 9-15. Analyzing the microseismic data can include additional or different techniques.

In some implementations, filtering and analyzing the microseismic data can be an iterative process with a terminating condition. For example, after analyzing the microseismic data at 640, the process 600 may go back to 630 for further microseismic data filtering. In some instances, the filtering can be based on the analyzed result at 640. For instance, the microseismic events may be filtered by removing low event density events that are vertices of a constructed boundary at 640. The microseismic data can be filtered based on additional or different criteria. The filtered microseismic data can be analyzed at 640 again, for example, for constructing an improved boundary. In some implementations, filtering and analyzing the microseismic data can be repeated until, for example, a predefined number of iterations is reached, outliers and low density events have been filtered, or another terminating condition is reached. In some implementations, the microseismic data can be filtered and analyzed in real time (or substantially in real time) during a stimulation treatment, or at another suitable time. In some implementations, the analyzing process at 640 can include the filtering process at 630.

At 650, the analyzed result can be displayed. For instance, the analyzed result can be displayed on a screen or another type of display apparatus. In some implementations, the analyzed result can be displayed, for example, in real time (or substantially real time) as the microseismic data are analyzed, after a final result is obtained, or at another time (e.g., when requested by a user). The analyzed result can include, for example, a geometrical representation of SRV, extensions of hydraulic fractures, or a combination of these and other types of visualizations. In some instances, the analyzed result can include a quantity of calculated SRV, uncertainty or accuracy of an SRV, an overlapping volume of SRVs, a percentage of the overlapping volume over the SRV of a treatment stage or of an entire injection treatment, or other information. FIGS. 3-5, 9-15 show example displays of analyzed results. Based on the displayed result, efficiency of a stimulation treatment can be evaluated. In some instances, a current or a prospective injection plan (e.g., injection schedules of future treatment stages, parameters of injection treatment, diversion techniques, etc.) can be adjusted based on the result.

FIG. 7 is a flow chart showing an example process 700 for identifying an SRV from microseismic data. All or part of the example process 700 may be computer-implemented, for example, using the features and attributes of the example computing subsystem 110 shown in FIG. 2 or other computing systems. The process 700, individual operations of the process 700, or groups of operations may be iterated or performed simultaneously to achieve a desired result. In some cases, the process 700 may include the same, additional, fewer, or different operations performed in the same or a different order.

At 710, a subset of microseismic events can be selected. In some implementations, the subset can be selected according to the filtering operation at 630 in FIG. 6, or in another manner. For instance, the subset of microseismic events can be selected from a superset of microseismic events based on respective locations of the subset of microseismic events. In some instances, the subset can include microseismic events whose locations are outliers in the superset of microseismic events. Additionally or differently, the subset of microseismic events can be selected based on respective event densities of the subset of microseismic events. For example, the subset can include microseismic events having event densities below a threshold density. The subset can be selected based on other criteria and may include other microseismic events.

At 720, a boundary can be calculated to enclose the locations of at least a portion of the microseismic events not included in the selected subset at 710. In some instances, the boundary is calculated to enclose locations of a second subset of microseismic events. The second subset of microseismic events can be different than the selected subset of microseismic events at 710. As a specific example, the second subset may include remaining microseismic events after removing outliers, low density events, or both in the selected subset at 710. In some implementations, the second subset can be selected from a superset of microseismic events based on respective times of the second subset of microseismic events. For instance, the second subset can include microseismic events that are associated with a single stage of a multi-stage injection treatment and the superset can include the microseismic events associated with multiple stages (e.g., all stages, or fewer than all stages) of the multi-stage injection treatment. In some instances, the second subset can be selected based on other criteria and may include other microseismic events. In some implementations, a subset hierarchy can be defined and the microseismic events can be selected in a successive manner. As a specific example, a full set can include locations of all microseismic events collected for a multi-stage injection treatment. Multiple first-layer subsets may be defined and selected such that they include locations of microseismic events associated with an individual stage of the multi-stage injection treatment. One or more second-layer subsets of locations can be selected from each of the first-layer subsets, for example, based on their respective locations, event densities, or any other attributes relative to the first-layer subset. In this case, the first-layer subset can be regarded as a superset of the one or more second-layer subsets. Additional or different layered subsets can be defined and selected.

In some implementations, the boundary can be a geometrical representation of a stimulated subterranean region and the volume of the geometrical object enclosed by the boundary can be the SRV for the stimulation treatment applied on the subterranean region. In some instances, the boundary can be a closed boundary. For example, the boundary can either intersect or contain each microseismic event in the second subset while the microseismic events in the selected subset at 710 reside outside the boundary. In some instances, a boundary can be defined by discrete points (e.g., discrete microseismic events) or the boundary can include one or more edges, curves, facets, or a combination of these and other geometrical elements. The boundary can be of any appropriate shape, for example, a rectangle, a circle, a polygon, a sphere, an ellipsoid, a polyhedron, etc. The boundary can be convex, concave, or have other geometric properties. In some implementations, the boundary can have two dimensions, three dimensions, etc. As an example, the boundary can be a 3D convex hull, 2D convex polygon (e.g., convex polygon 515, 525, 535, or 535), or an ellipsoid enclosing a set of microseismic event locations. In some implementations, a boundary may be represented by certain parameters (e.g., a center, a radius, an angle, a curvature, the number of vertices, the number of edges, etc.). The boundary can be calculated by identifying the parameters that describe the boundary.

In some implementations, a 2D boundary can be calculated, for example, according to a similar process described above, based on the example technique described with respect to FIG. 5, or based on additional or different techniques. For instance, calculating a 2D boundary may involve projecting 3D microseismic events onto a reference plane (e.g., the horizontal plane) and computing the 2D boundary based on the projected 2D events.

At 730, an SRV can be estimated or otherwise identified based on the calculated boundary. For example, the SRV can be identified by calculating the interior volume of the boundary. In some implementations, different techniques may be used to calculate the quantity of SRV. For example, the calculated boundary may be represented by parameters (e.g., a center, a radius, an angle, a curvature, the number of vertices, the number of edges, etc.), and the SRV can be identified by calculating a volume of the boundary, for example, based on the parameters of the boundary, a volume computation, or other considerations.

At 740, the boundary can be displayed. In some implementations, the boundary can be displayed in the manner described with respect to 650 in FIG. 6. For instance, the boundary can be displayed as a geometric object (e.g., a convex hull, or another type of object). The calculated quantity of SRV can be displayed as well. In some instances, the boundary, the SRV quantity, or other SRV data can be displayed in real time during a stimulation treatment.

Figure 8:
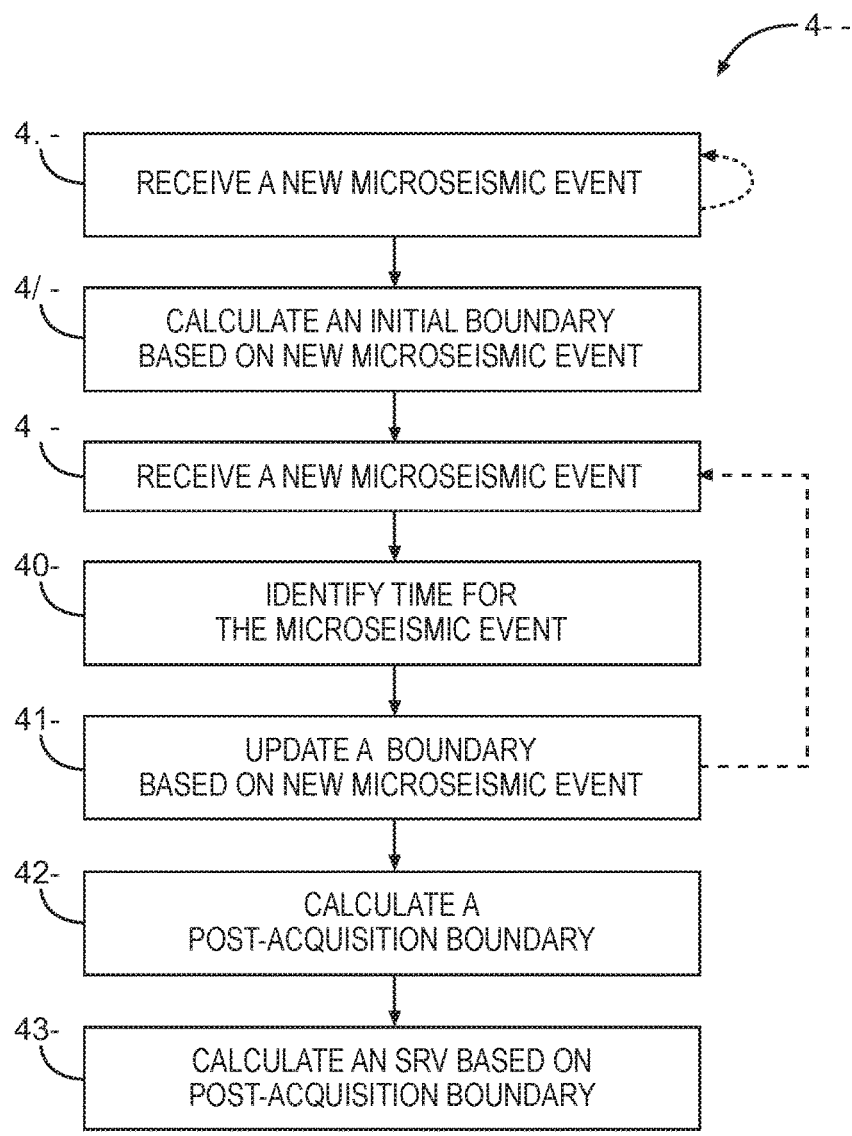
FIG. 8 is a flow chart showing an example technique for calculating SRV in real time.

FIG. 8 is a flow chart showing an example process 800 for real-time SRV calculation. All or part of the example process 800 may be computer-implemented, for example, using the features and attributes of the example computing subsystem 110 shown in FIG. 2 or other computing systems. The process 800, individual operations of the process 800, or groups of operations may be iterated or performed simultaneously to achieve a desired result. In some cases, the process 800 may include the same, additional, fewer, or different operations performed in the same or a different order.

As disclosed herein, the fracture matching technology is used to identify the fracture orientations embedded in collected post-job 3D spatial based microseismic events and to extract hydraulic fractures based on the optimal match processes. The statistics over the identified fracture samples characterizes the geometric information of hydraulic fracture patterns, including fracture azimuth, fracture dip angle, fracture size (length, height, area), fracture spacing density and fracture network complexity. In addition to the geometric information of hydraulic fracture patterns, the real-time fracture matching technique allows for capturing the time-dependent dynamical evolution of fracture properties based on 4D (spatial coordinates and event occurrence time) during the real-time hydraulic fracturing process. These properties include fracture propagation activity, fracture growth dynamics, microseismic event accumulation function, seismic moment distribution evolution, stimulated reservoir contact area development and fractured rock volume evolution.

At 810, data for a new microseismic event is received. In some instances, the new microseismic event is received in real time during a stimulation treatment. The new microseismic event data can be stored in a buffer or other type of memory for further processing. In some implementations, the location of the new microseismic event can be determined and its distances to one or more perforation clusters of the injection treatment can be calculated and compared. A perforation cluster may include one or more perforations. In some implementations, the new microseismic event can be associated with the perforation cluster that has the minimum distance and the event can become a supporting event of the perforation cluster. In some instances, the example process 800 may not proceed to 820 until enough data for new microseismic events have been received. For instance, a minimum number of events (e.g., supporting events of a perforation) may need to be accumulated before executing example operation at 820.

At 820, an initial boundary can be computed based on the microseismic events. In some instances, the initial boundary can be associated with a perforation cluster. The initial boundary can be calculated based on the supporting events of the perforation cluster. As an example, the initial boundary can be a tetrahedron constructed based on four supporting events of a perforation cluster. The initial boundary can be of another shape, and it can be calculated based on another number of events, for example, according to one or more operations of the example process 700. In some implementations, an injection treatment or a stage of an injection treatment may contain more than one perforation clusters. In this case, more than one initial boundary can be calculated based on respective supporting events of the multiple perforation clusters. In some instances, the perforation cluster can be regarded as the center of the calculated initial boundary.

At 830, data for a new microseismic event is received. The new microseismic event data can be received in real time during the stimulation treatment. In some implementations, the new microseismic event can be received after one or more boundaries (e.g., initial boundaries) have been computed. The one or more boundaries can be previously computed to enclose locations of prior microseismic events associated with the stimulation treatment.

At 840, a time is identified for the microseismic event. The time can be stored as a parameter to record the time at which the microseismic event occurred. In analyzing the fracture properties based on the microseismic events, the time can factor in to analyze the change in the various parameters for the fracture formation.

At 850, a boundary is modified based on the data for the new microseismic event. In some implementations, modifying the boundary includes merging two or more boundaries into a single boundary, for example, based on the location of the new microseismic event relative to the centers of the two or more boundaries. As an example, two boundaries may be merged together if a difference between the distances from the new event to the centers of the two boundaries is less than a threshold distance. Two or more boundaries may be merged based on other criteria. In some instances, the initial boundaries associated with respective perforation clusters can be merged into a single boundary representing a stimulated volume for the received microseismic events. In some instances, if the new microseismic event resides inside a boundary, the boundary may not need to be modified. If the new microseismic event resides outside a boundary, the boundary can be identified and modified to enclose the new microseismic event, for example, based on a facet expansion operation or other techniques. An SRV can be identified and updated based on the calculated boundary in real time.

In some instances, modifying the boundary can include updating a selected subset of the microseismic events based on the data for the new microseismic event, and calculating the boundary based on the updated subset. In some instances, the selected subset of microseismic events can be updated by identifying and removing outliers and microseismic events with low event density. Outliers and low density events can be removed, for example, during a stimulation treatment, after acquiring of microseismic event data, or from time to time. The outliers and microseismic events can be identified, for example, based on the respective statistical properties, tagged probabilities, or another attribute.

In some instances, operations at 830 and 840 can be repeated until no more new microseismic events are received, until a predetermined time, or until another terminating condition. The boundary can keep expanding as new microseismic event data gradually accumulate. In some implementations, as more microseismic event data accumulate in time, the SRV estimation based on the updated boundary can become more accurate. In some instances, the real-time SRV calculation algorithm can produce an SRV estimation with monotonically increasing accuracy.

At 860, a post-acquisition boundary is calculated. The post-acquisition boundary can be a boundary computed after the microseismic data acquisition. In some implementations, a filtering operation (e.g., the filtering operation at 630 in FIG. 6) can be applied to some or all of the acquired microseismic event data. The post-acquisition boundary can be calculated based on remaining microseismic events after filtering out, for example, deterministic outliers, statistical outliers, low density events, or other microseismic events.

At 870, an SRV is calculated based on the post-acquisition boundary. In some instances, the volume enclosed by the post-acquisition boundary is calculated as the SRV for the associated injection treatment.

In some implementations, the received new microseismic events and the calculated boundary can be displayed in real time during the stimulation treatment. For example, each time data for a new microseismic event is received, it can be displayed as a geometrical object (e.g., a dot) in a spatial domain, for example, as shown in FIGS. 11-15. A boundary, its corresponding SRV quantity, uncertainty of the SRV, or other data can be calculated, updated, and displayed accordingly based on received microseismic event data. In some cases, the dynamic propagation and growth of the boundary can be displayed in real time. Users (e.g., field engineers, operational engineers and analysts, and others) can visualize the geometry of SRV and identify the temporal and spatial evolution of SRV in a real time fashion, including based on the time of the events' occurrence. In some implementations, based on the observation of SRV evolution, injection treatment can be managed and adjusted accordingly to control the SRV development to maximize the SRV and formation production.

Figure 9A:
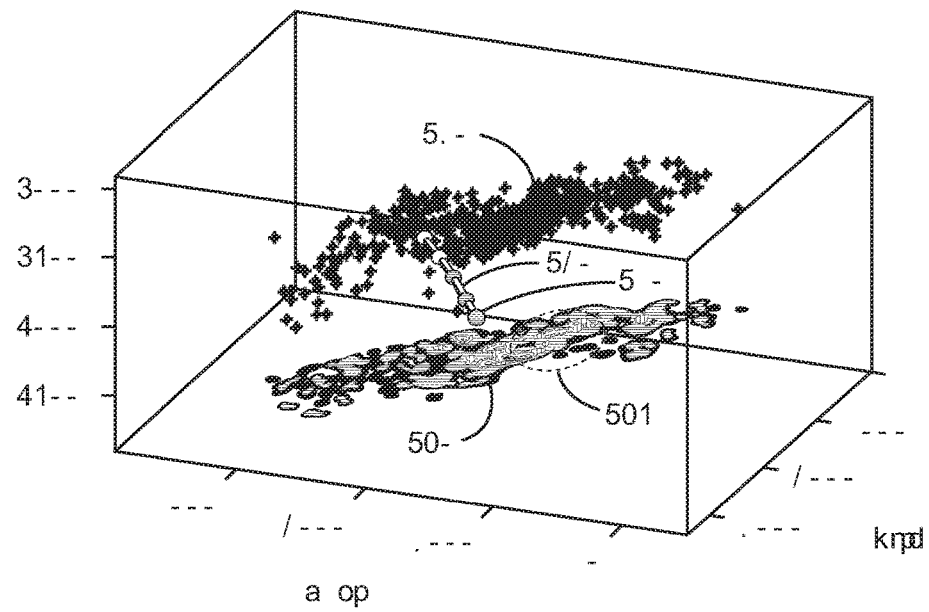
FIG. 9A is a plot showing another example of microseismic event data collected from a multi-stage injection treatment.

An example of collected 3D microseismic data with 770 events was plotted in FIG. 9A. The microseismic events 910 can also be plotted by showing the spatial distribution and corresponding event density 940. The more microseismic events are generated in a particular location, the more density 945 is displayed in the figure. The wellbore 920 can be perforated at multiple stages based on perforations 930 made in those regions.

Figure 9B:
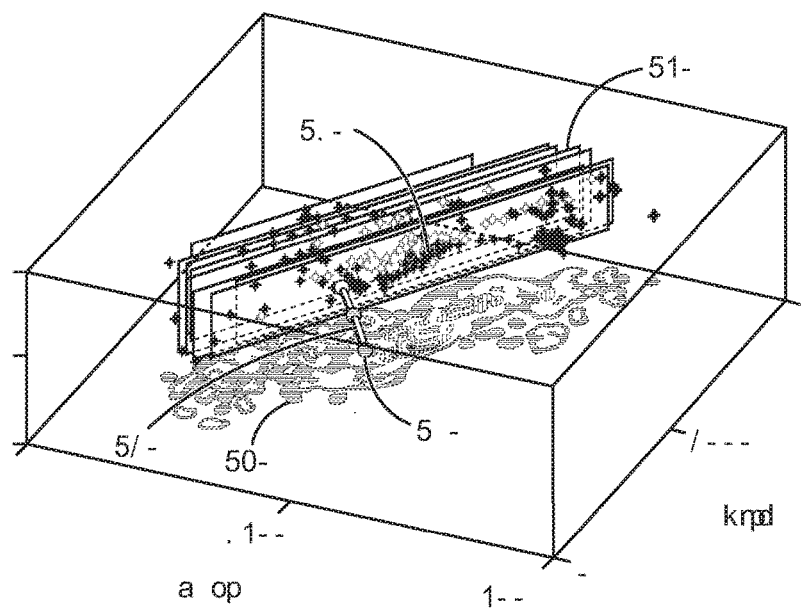
FIG. 9B is a cross-section showing example hydraulic fracture planes for the microseismic event data collected from a multi-stage injection treatment.

FIG. 9B is a cross-section showing example hydraulic fracture planes for the microseismic event data collected from a multi-stage injection treatment. FIG. 9B shows eight fracture planes 950 that are identified and extracted from the microseismic events 910 data and those contain the following geometric parameters: average length of 3046.3 (ft), average height of 528.4 (ft), average spacing density of 86.7 (ft), azimuth of N32.8°E, dip angle of 87.04°. These fractures exhibit the transverse behaviors (normal to the length of wellbore) as the original hydraulic fracture program was designed so as to obtain the maximum fracture extension.

Figure 10A:
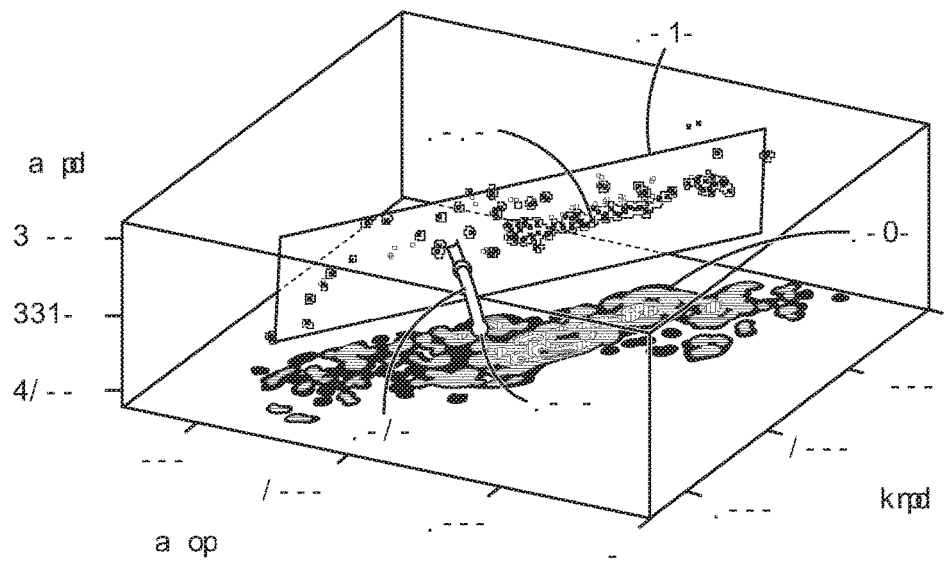
FIG. 10A is another plot and example hydraulic fracture plane for microseismic event data collected from a multi-stage injection treatment.

FIG. 10A is another plot and example hydraulic fracture plane 1010 for microseismic event data 1050 collected from a multi-stage injection treatment. FIG. 10A is a fracture plane for example microseismic event data for identifying the cluster of hot spots for the microseismic activity. The microseismic event data could be generated from the wellbore 1020 which can be perforated at multiple stages based on perforations 1030 made in those regions. The density 1040 identifies clusters of microseismic events.

Figure 10B:
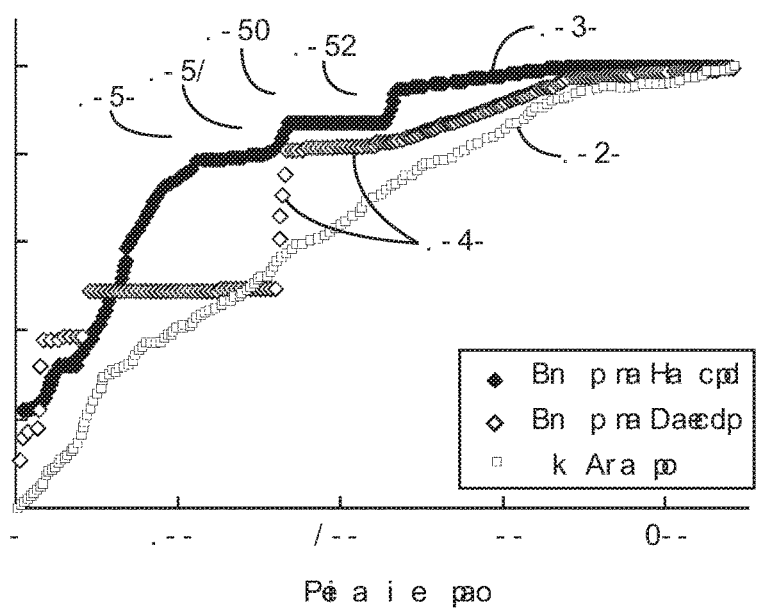
FIG. 10B is a chart illustrating the evolution of fracture parameters, including length, height and microseismic event data.

FIG. 10B illustrates the relationship of the growth of the fracture evolution parameters based on the occurrence time of the microseismic events 1060. Fracture length 1070 can be shown based on time in minutes (horizontal axis) which demonstrates the evolution of the fracture length over time. Similarly, by capturing and using the real-time data associated with the occurrence time of the microseismic events 1060, the fracture height 1080 can also be evaluated as a function of time.

Figure 11:
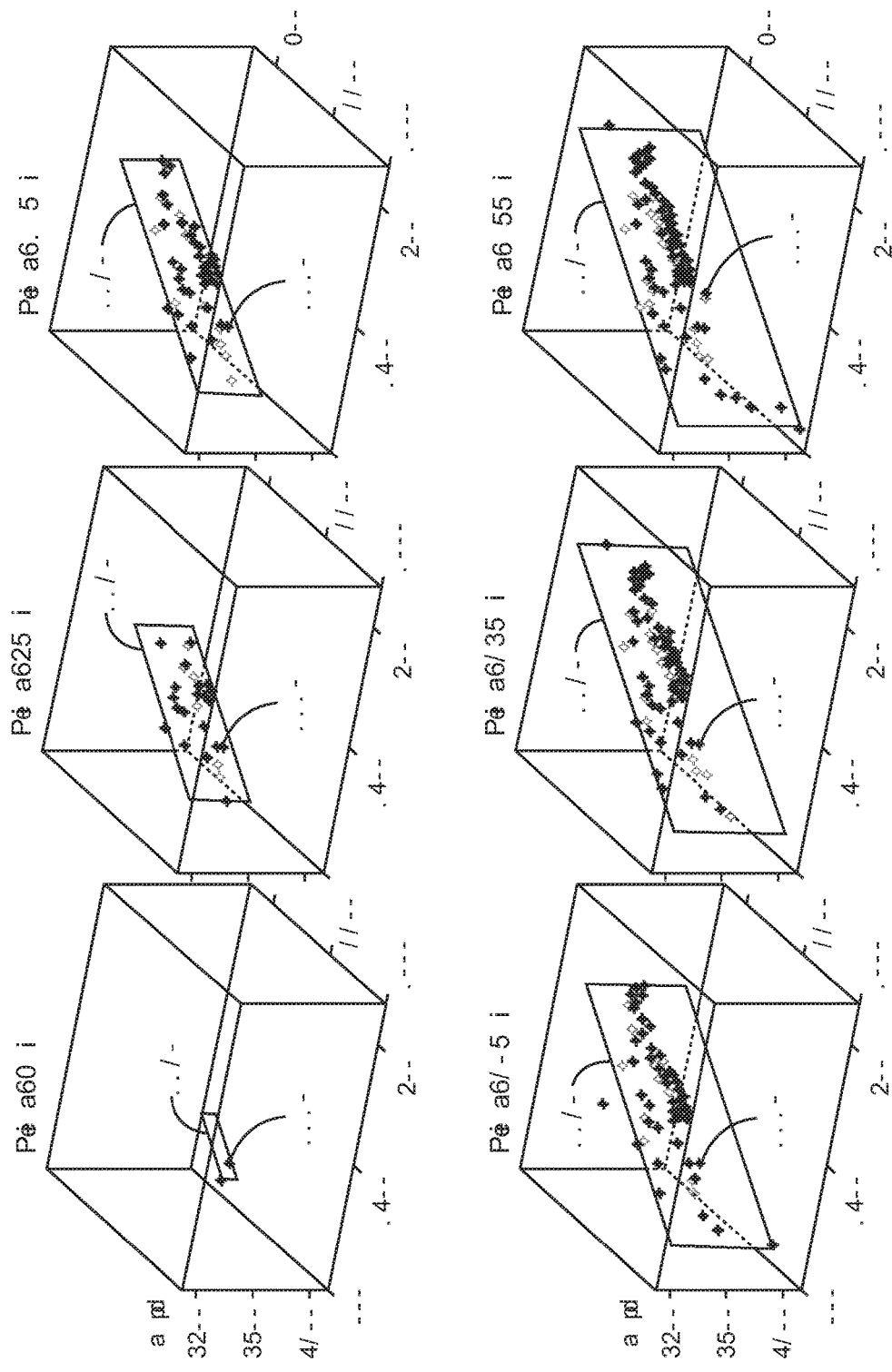
FIG. 11 is a chart illustrating microseismic event data and a hydraulic fracture plane based on occurrence time of the microseismic events.

FIG. 11 is a chart illustrating microseismic event data and a hydraulic fracture plane based on occurrence time of the microseismic events. FIG. 11 is demonstrating the evolution of fracture length and height based on a typical fracture plane shown in 10A at six treatment moments: length of 717.93 (ft) and height of 69.15 (ft) at 4 minutes from the beginning of treatment showing microseismic events 1110 and the fracture plane 1120; length of 1913.49 (ft) and height of 313.83 (ft) at 69 minutes with event accumulation and fracture plane; length of 2593.31 (ft) and height of 316.12 (ft) at 139 minutes; length of 2852.20 (ft) and height of 522.68 (ft) at 209 minutes; length of 3163.88 (ft) and height of 565.06 (ft) at 279 minutes; length of 3269.63 (ft) and height of 630.72 (ft) at 399 minutes with each interval having event accumulation and fracture plane based on the realtime status of the microseismic events. Of course, the selection of the minutes is exemplary and the fracture evolution parameters can be viewed at any minute. The number of events at these six moments is 3, 59, 87, 120, 147 and 173, respectively. It shows that during the period between 69 minutes and 139 minutes, the treatment fluid mainly contributes to the transverse propagation but almost no impact on fracture height. After treatment, the fracture shown in FIG. 10A has the length of 3269.63 (ft), height of 638.40 (ft), azimuth of N32.54°E, dip angle of N85.69°, and the high density areas such as shown in 945 represent the microseismic events (181) and the spatial distribution on the fracture.

Characteristics can be extracted from the data (such as the length, height, azimuth, dip angle, and various other characteristics) to characterize the dynamics of the fracture of the subterranean region. As shown in FIG. 10B, fracture height 1080 growth, fracture length 1070 propagation, and microseismic event 1060 accumulation can be viewed as functions of treatment time (in minutes). The total treatment time is 446 minutes (7 hours and 47 minutes). It shows that there is a rapid/sudden increase of fracture length and fracture height during the early hydraulic fracturing process, which is related to the fracture initialization, its pressure accumulation and fracturing "breakdown" process. As the fracture initialization pressure exceeds the sum of the minimum principal stress and tensile strength of the fracture, fracture propagates away from the nearby well along the direction normal to the direction of the minimum principal. The transverse fracture behavior shows the minimum principal stress is the horizontal component. The in-situ principal stresses and their orientations within stimulated reservoirs control fracture propagation and growth patterns. If the maximum horizontal principal stress is normal to the minimum horizontal principal, in other words, hydraulic fractures propagates along the direction of the maximum horizontal principal stress, the stimulated reservoir geometry generated by hydraulic fracturing efforts is relative simple and planar; on the other hand, i.e. the fracture propagates at some angle with the direction of the maximum horizontal principal stress, hydraulic fractures will re-orientate at the far-treatment field and will generate very complex fracture networks.

It also shows that fracture propagates continuously but grows in sudden jumps. This fact indicates that the overburden vertical stress is the maximum principal stress component. The fracture propagation rate and growth rate depends on the maximum horizontal principal stress, overburden vertical stress, tensile strength and rock formation properties. Furthermore, during the period between A 1090 and B 1092 labeled in FIG. 10B and the period between C 1094 and D 1096, although the fracture's length and height change very small, the accumulation rate of microseismic events nearly keep the same. These microseismic events are mostly likely related to leak-off of the high-pressure fracturing fluid into pre-existing natural fractures or other permeable or activated features within the stimulated reservoir. The integration of event accumulation function and the geo-mechanical analysis helps to map out the distribution of reservoir stress state (strength and orientation) and to better understand the complexity of hydraulic fracture network due to the complex interaction with pre-existing natural fractures.

Figure 12:
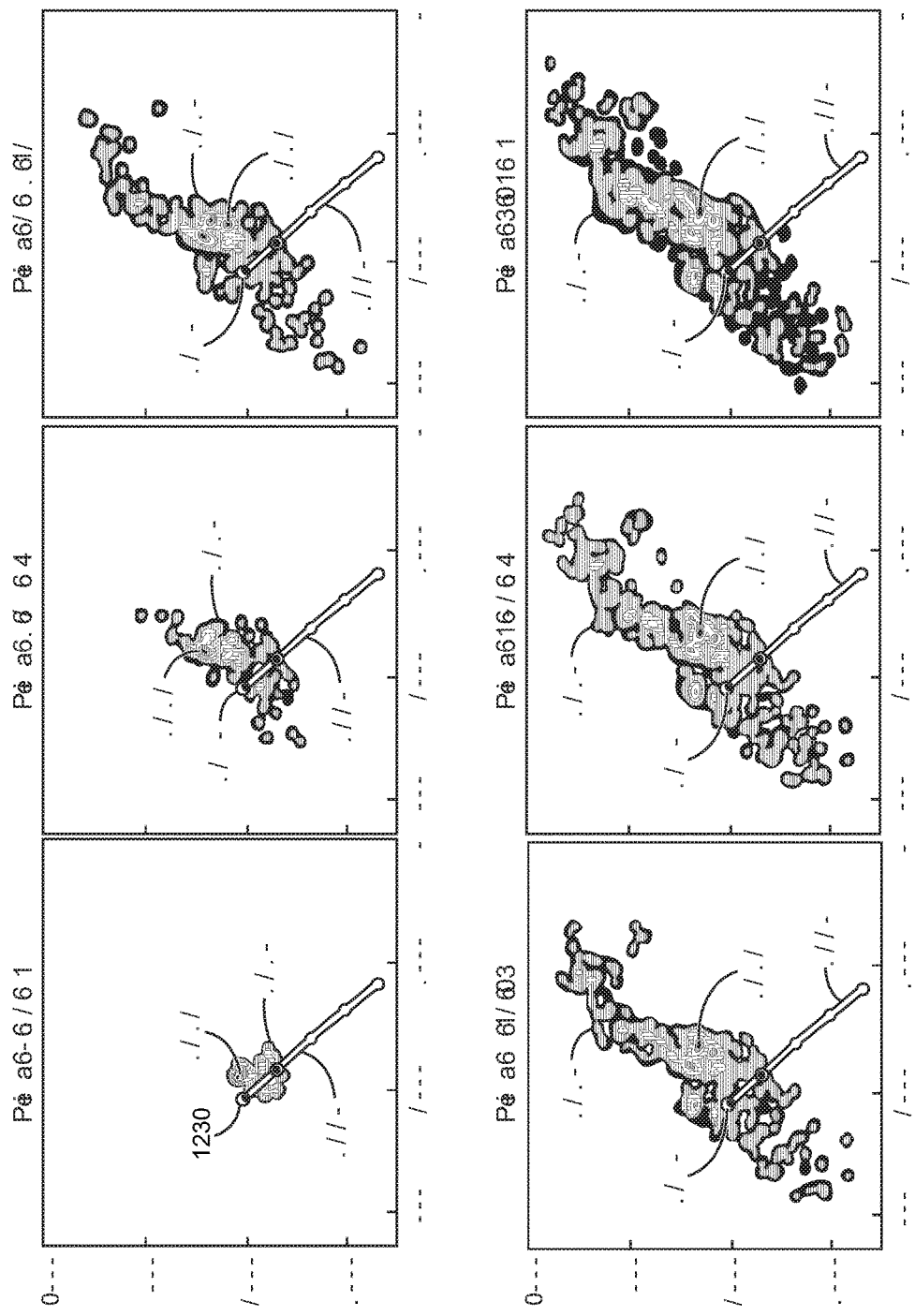
FIG. 12 is another plot showing example microseismic event data collected from a multi-stage injection treatment based on occurrence time of the microseismic events.

FIG. 12 is another plot showing example microseismic event data collected from a multi-stage injection treatment based on occurrence time of the microseismic events. FIG. 12 identifies the stimulated subterranean region at six moments in the format of hours, minutes, and seconds, as shown in the time entries in FIG. 12. The wellbore 1220 uses perforations, such as perforation 1230 to release stimulant into the subterranean region. That may cause microseismic events to be generated and result in detection of various microseismic activity. The entirety of the area impacted by the stimulation treatments 1210 can be vast and may occur in overlapping stages. Even more particular, that could identify areas of high density 1212. In areas of high density, there is likely a greater chance that hydrocarbon production would occur. As such, a user can vary their fracturing strategy in realtime fashion based on the time data associated with the various microseismic events to identify and use the fracture evolution parameters to enhance the characterization of the subterranean region. By including the occurrence time of the microseismic events, a user may be able to determine whether a certain microseismic event was triggered in a particular stage of a multi-stage injection treatment. FIG. 12 is a planar view of the stimulated reservoir volume appearing as a function of time is shown in FIG. 13.

Figure 13:
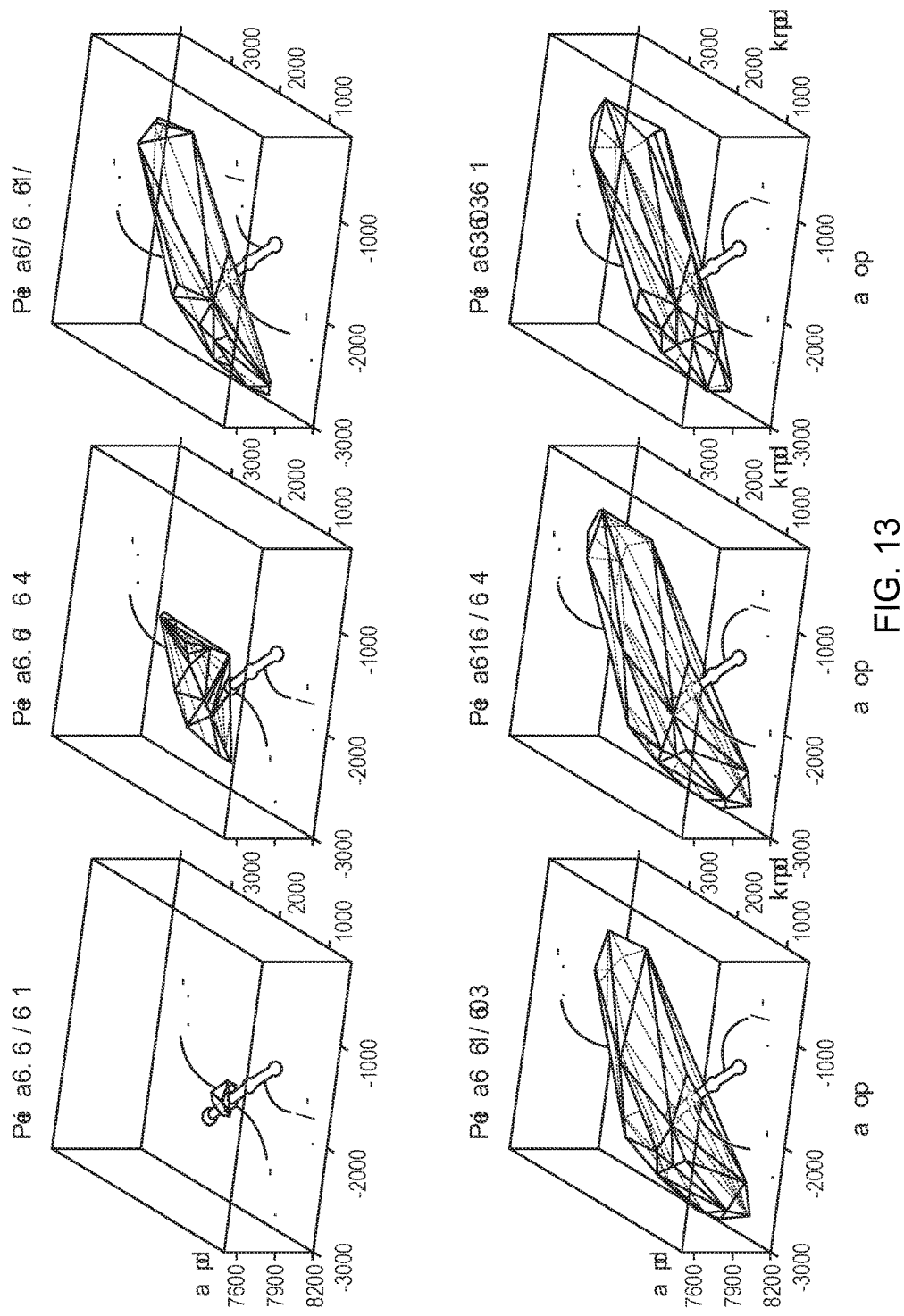
FIG. 13 is a plot showing a three-dimensional representation of stimulated reservoir volumes (SRVs) associated with respective stages of a multi-stage injection treatment based on occurrence time of the microseismic events.

FIG. 13 plots the evolution of the stimulated reservoir volume (SRV) at six treatment moments: 0:12:35, 1:23:38, 2:31:52, 3:52:47, 5:02:18 and 7:47:35. The mathematical volumes at these six moments are 0.02217, 0.9337, 3.028, 5.034, 5.644 and $7.83 \times 10^8$ (ft$^3$). The SRV is for a wellbore 1320 for a multistage injection treatment using perforations 1320. The SRV 1310 is shown enclosed at the six treatment moments.

Figure 14A:
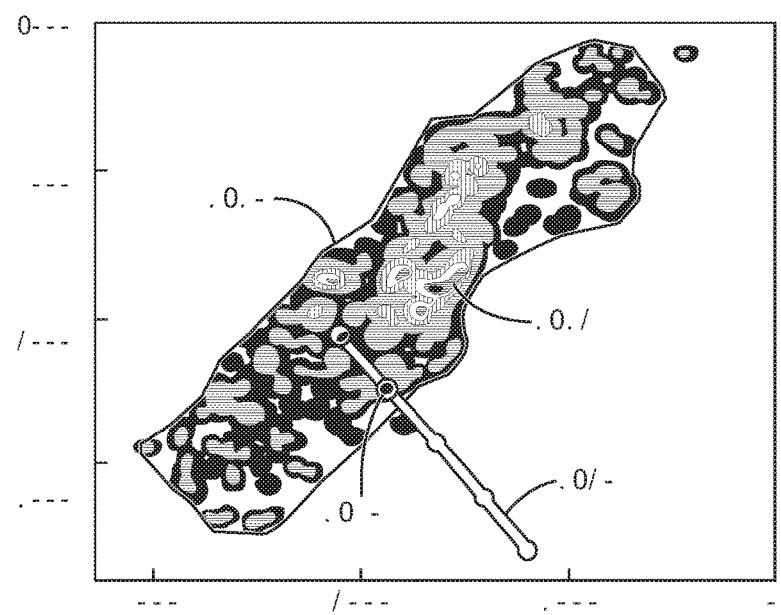
FIG. 14A is a plot showing microseismic event data for an area enclosed by a curve for a multi-stage injection treatment.

FIG. 14A is a plot showing microseismic event data for an area enclosed by a curve for a multi-stage injection treatment. The various microseismic events that generate the density map for the enclosed stimulated reservoir area 1410 show the various effects of stimulation treatment to the subterranean region. Areas of higher density 1412 demonstrate the concentration of microseismic events that lead to "hot spots" where likely hydrocarbon production may occur. The eventual stimulated reservoir area is $2.3489 \times 10^6$ (ft$^2$) shown in 14A, which is enclosed by the curve 1410. It provides the initial drainage area and 2D geometry of the hydraulic fracture network for fracturing of subterranean region reservoir models.

In addition to the evolution of individual hydraulic fractures, the time-dependent dynamics of hydraulic fracture networks and stimulated reservoirs can also be identified and calculated based on the acquired 4D microseismic events using the enhanced convex and concave hull approaches. First, the stimulated reservoir area (SRA) can be represented by the map of microseismic event density as shown in FIG. 14A. FIG. 12 depicts the evolution of the stimulated reservoir area at six treatment moments, which is in the format of hours:minutes:seconds from the beginning of treatment: 0:12:35 (12 minutes and 35 seconds), 1:23:38 (1 hour, 23 minutes and 38 seconds), 2:31:52, 3:52:47, 5:02:18 and 7:47:35. The areas of the stimulated reservoir at these six moments are 0.1004, 0.62525, 1.405, 1.8095, 2.169 and $2.3489 \times 10^6$ (ft$^2$). The high bright regions in the figures indicate high value of microseismic event density and provide the possible treatment fluid pathways. It shows how hydraulic fractures initialize near the perforation clusters during the early hydraulic fracturing phase and gradually transversely propagate away from the wellbore. The eventual stimulated reservoir area is $2.3489 \times 10^6$ (ft$^2$) shown in 14A, which is enclosed by the curve 1410. It provides the initial drainage area and 2D geometry of the hydraulic fracture network for fracturing of subterranean region reservoir models.

Figure 14B:
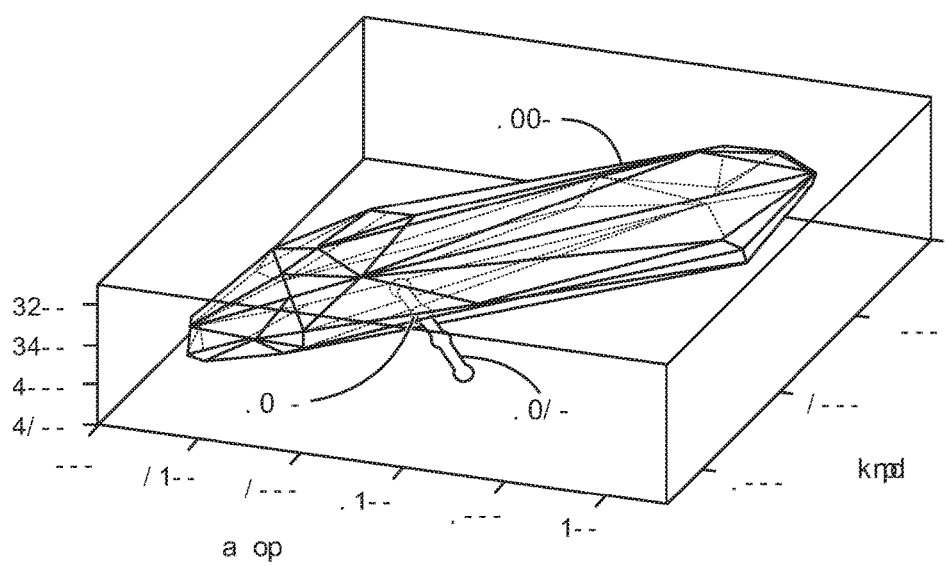
FIG. 14B is another example showing a stimulated reservoir volume for a multi-stage injection treatment.

FIG. 14B plots the eventual three-dimensional physical geometry of the stimulated reservoir volume 1440 of a multistage injection treatment of a wellbore 1420 using perforations 1430 with geometric parameters: volume of $7.83 \times 10^8$ (ft$^3$), length of 3676.3 (ft), width of 1058.32 (ft), height of 648.34 (ft) and the orientation azimuth N38.96°E. The stimulated rock's azimuth is consistent of azimuth (N32.8°E) of hydraulic fracture patterns shown in FIG. 9B. It also provides the initial drainage volume and 3D geometry of hydraulic fracture network for unconventional reservoir models. The fracture complexity index (FCI) defined by the ratio of SRV's width over SRV's length is 0.288, indicating the simple geometry of fracture network, which is also confirmed by FIG. 14B, which includes the wellbore 1420. The SRV acts as the boundary and interface between the hydraulic fracturing rock formation and the un-stimulated reservoir.

Figure 15A:
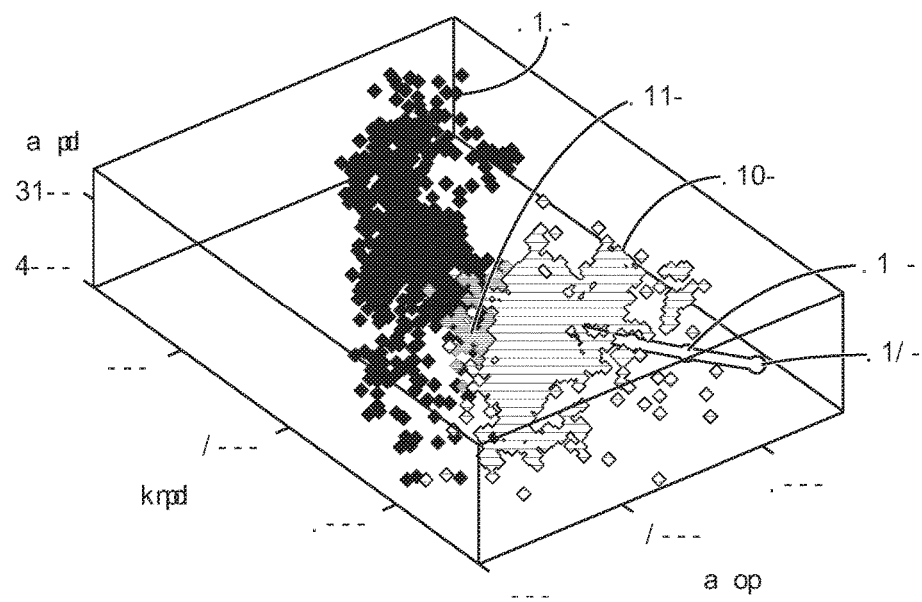
FIG. 15A is a plot showing the intersection of microseismic event data for multiple stages of a multi-stage injection treatment.

FIG. 15A is a plot showing the intersection of microseismic event data for multiple stages of a multi-stage injection treatment. In FIG. 15A, the example plot shows the microseismic events collected in Stage 1 1510, the microseismic events acquired in Stage 2 1540, and common microseismic events shared by Stages 1 and 2 1550. These microseismic events are generated for a multistage injection treatment of a wellbore 1520 using multiple perforations 1530.

Figure 15B:
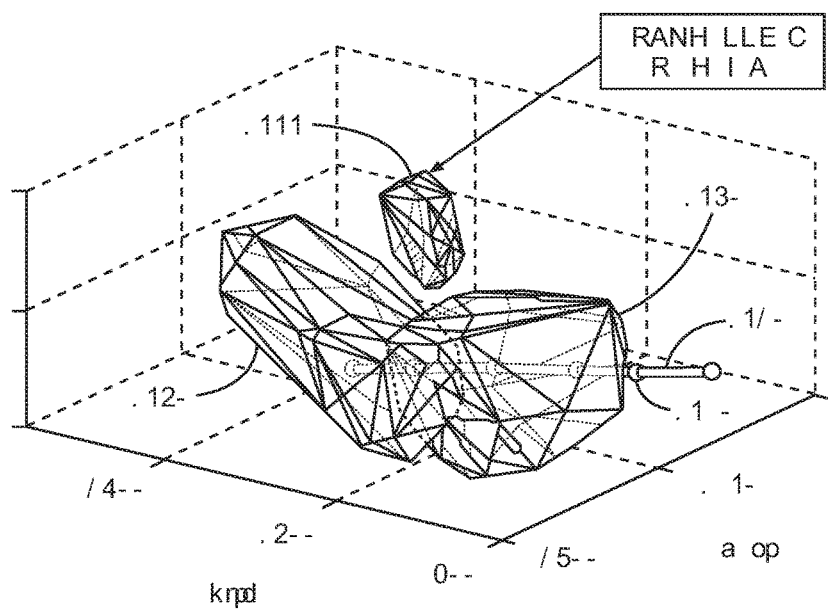
FIG. 15B is another example showing a stimulated reservoir volume and an overlapping volume for multiple stages for a multi-stage injection treatment.

FIG. 15B plots the corresponding SRVs from the Stage 1 microseismic events, including the SRV for Stage 1 1560, and the SRV for Stage 1, 1570, constructed by these two stages' microseismic data and the overlapping volume 1555. The Stage 2's stimulation effectiveness is 91.0% and the overall stimulation effectiveness for these two stages is 95.1%. The total pumped fluid volume used in Stage 1 is 20400 barrels and the total fracture surface area based on eight identified hydraulic fractures shown in FIG. 01 (*b*) is $12.9945 \times 10^6$ (ft$^2$).

As microseismic events grow into previous-stage's fractured zone for multistage hydraulic fracturing treatment, it indicates the connection/interaction between these treatment stages and the loss of current stage's treatment fluid. The SRV analysis is able to capture the overlapping volume based on common microseismic events shared by these stages and provide the quantitative measure of the stimulation effectiveness. Furthermore, the evolution function of fracture aperture can be directly calculated using the real-time treatment pumping data, given by $$\text{fracture aperture} = \frac{\text{volume of treatment fluid} \times \text{stimulation effectiveness}}{\text{total fracture surface area}}$$

Based on the above formula, the average fracture aperture is 0.1058 (inch), measuring the capability to hold the proppant.

This invention provides the opportunity to integrate the realtime information of hydraulic fracturing stimulation regarding four aspects: 1) time-dependent evolution parameters of fracture length propagation and height growth; 2) accumulation function of microseismic events; 3) dynamics of stimulated reservoir contact area; 4) evolution of fractured rock volume. All the realtime information, including the events' occurrence time and data enhance the reservoir characterization and better understand the impact of stimulation on unconventional treatment reservoirs. The integration of the detailed data into the complex fracture propagation models and fracturing reservoir models helps to calibrate the models' parameters and to obtain the reasonable and objective results for users. The visualization integrating the time-dependent dynamical evolutions of hydraulic fracture patterns, stimulated reservoir area and fractured rock geometry helps the field engineers and operators to analyze and control the real-time development of hydraulic fracturing stimulation, to adjust the hydraulic fracturing strategy, to maximize the reservoir area and stimulated volume, and to enhance the hydrocarbon productivity.

With the benefit of the present disclosure, the invention also presents the opportunity to: (1) identify the realtime evolution of fractures in a subterranean region; (2) identify the time-dependent dynamics of stimulated reservoir contact area; (3) identify the dynamical development of stimulated reservoir volume of a fracture in a subterranean region; and (4) quantitatively describe the fracture length, height, the accumulation functions of the microseismic events based on treatment time for a stimulation treatment.

In some implementations, analyzing the subterranean region can include identifying or otherwise analyzing one or more of a length, a width, a height, or an orientation of the SRV for the stimulation treatment of the subterranean region, for example, based on the geometry parameters or properties of the boundary. For instance, the length, width, and height of the computed boundary can be used to approximate the length, width, and height of the stimulated region, respectively. In some instances, the length of the stimulated region can represent the extension of the hydraulic fracture network to the reservoir while the width can relate to the number and the spacing of fractures in the primary fracture family. In some instances, the orientation of the major axis of SRV can represent the orientation of the primary fracture family in the subterranean region. For example, analyzing the subterranean region can include identifying or otherwise analyzing the fracture orientation associated with the stimulation treatment of the subterranean region based on the major axis. In some implementations, analyzing the fracture orientation can include comparing the orientation of the SRV identified based on the major axis with the orientation of the hydraulic fractures identified based on, for example, fracture matching techniques. In some implementations, one of the two identified orientations can be used as a baseline to assess or confirm the correctness of the other.

In some implementations, analyzing the subterranean region includes analyzing whether the identified length, width, height, orientation, or another property of the SRV meet a respective criterion that reflects a desired length, width, height, orientation, or another property for the stimulation treatment. In some implementations, hydrocarbon productivity of the stimulated region can be predicted, calculated, or otherwise analyzed and the stimulation treatment can be adjusted or otherwise controlled, for example, based on the analyses of the subterranean region.

In some implementations, an uncertainty of the identified boundary, the identified volume, major axis, or any other geometric properties of the SRV for the stimulated region can be identified, for example, based on the uncertainty (e.g., in location, moment, time, etc.) of the microseismic events. In some implementations, the uncertainties can be identified according to one or more example operations of the process, based on probabilities, or in another manner.

In some implementations, some or all of the operations in the example processes are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the stimulation treatment. Some real-time operations can receive an input and produce an output during a fracture treatment; in some instances, the output is made available to a user within a time frame that allows the user to respond to the output, for example, by modifying the fracture treatment.

In some cases, some or all of the operations in the example processes are executed dynamically during a fracture treatment. An operation can be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.).

Some implementations of subject matter and operations described in this specification can be implemented in digital electronic circuitry, or in computer software, firmware, or hardware, including the structures disclosed in this specification and their structural equivalents, or in combinations of one or more of them. Some implementations of subject matter described in this specification can be implemented as one or more computer programs, i.e., one or more modules of computer program instructions, encoded on computer storage mediums for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, as well as declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and are interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple implementations separately or in any suitable subcombination.

A number of examples have been described. Nevertheless, it will be understood that various modifications can be made. Accordingly, other implementations are within the scope of the following claims.

What is claimed is:
1. A method comprising:
receiving data representing a new microseismic event associated with a stimulation treatment of a subterranean region;
identifying a stimulated reservoir volume (SRV) boundary previously computed based on locations of prior microseismic events associated with the stimulation treatment;
identifying a real-time parameter for the new microseismic event;
modifying the boundary based on the data representing the new microseismic event, wherein the modifying is based at least in part on the real-time parameter for the new microseismic event;
identifying a stimulated reservoir volume based on the modified boundary;

identifying a stimulation effectiveness based on the stimulated reservoir volume;
computing a fracture aperture for the stimulation treatment of the subterranean region based at least in part on the stimulation effectiveness; and
displaying the modified boundary during the stimulation treatment.

2. The method of claim 1, further comprising computing at least one fracture evolution parameter.

3. The method of claim 2, further comprising wherein the at least one fracture evolution parameter may include one of height, length, azimuth, or dip.

4. The method of claim 3, wherein modifying the boundary comprises updating the boundary in real time according to a time associated with the new microseismic event according to an iterative algorithm that produces an SRV estimation.

5. The method of claim 4, further comprising storing the one of the at least one fracture evolution parameter as a function of the time associated with the new microseismic event.

6. The method of claim 1, wherein modifying the boundary and displaying the modified boundary are in real time during the stimulation treatment.

7. The method of claim 1, further comprising identifying a stimulated contact area based on the new microseismic event.

8. The method of claim 1, further comprising identifying an overlap between the stimulated reservoir volume and a second stimulated reservoir volume.

9. The method of claim 1, further comprising adjusting the stimulation treatment based on the modified boundary.

10. A non-transitory computer-readable medium storing instructions that, when executed by data processing apparatus, perform operations comprising:
receiving new microseismic event data associated with a stimulation treatment of a subterranean region, the new microseismic event data identifying a plurality of microseismic event locations, further wherein the new microseismic event data is associated with a real-time parameter;
identifying a stimulated reservoir volume (SRV) boundary previously computed to enclose locations of prior microseismic events associated with the stimulation treatment;
modifying the boundary based on the new microseismic event data;
displaying the modified boundary during the stimulation treatment;
identifying a stimulated reservoir volume based on the modified boundary;
identifying a stimulation effectiveness based on the stimulated reservoir volume; and
computing a fracture aperture for the stimulation treatment of the subterranean region based at least in part on the stimulation effectiveness.

11. The computer-readable medium of claim 10, the operations further comprising identifying a stimulation contact area based on the new microseismic event data.

12. The computer-readable medium of claim 10, the operations further comprising identifying an overlap between the stimulated reservoir volume and a second stimulated reservoir volume.

13. A computing system comprising:
a communication interface operable to receive data for a new microseismic event associated with a stimulation treatment of a subterranean region, wherein the new microseismic event is associated with a real-time parameter;
data processing apparatus operable to
identify a stimulated reservoir volume (SRV) boundary previously computed based on locations of prior microseismic events associated with the stimulation treatment;
modify the boundary based on the data for the new microseismic event;
display the modified boundary during the stimulation treatment;
identify a stimulated reservoir volume based on the modified boundary;
identify a stimulation effectiveness based on the stimulated reservoir volume identify a stimulated reservoir volume based on the boundary; and
compute a fracture aperture for the stimulation treatment of the subterranean region based at least in part on the stimulation effectiveness.

14. The computing system of claim 13, the data processing apparatus being operable to compute at least one fracture evolution parameter.

15. The computing system of claim 14, wherein the at least one fracture evolution parameter may include one of height, length, azimuth, or dip.

16. The computing system of claim 13, the data processing apparatus being operable to modify the boundary in real time during the stimulation treatment.

17. The computing system of claim 16, the data processing apparatus being operable to update the boundary in real time according to a time associated with the new microseismic event according to an iterative algorithm that produces an SRV estimation.

18. The computing system of claim 13, the data processing apparatus being operable to identify a stimulated contact area based on the new microseismic event.

19. The computing system of claim 13, the data processing apparatus being operable to identify an overlap between the stimulated reservoir volume and a second stimulated reservoir volume.

20. The computing system of claim 13, the data processing apparatus being operable to adjust a stimulation treatment based on the boundary.

* * * * *